US010264473B2

(12) United States Patent
Kimura

(10) Patent No.: US 10,264,473 B2
(45) Date of Patent: Apr. 16, 2019

(54) COMMUNICATION CONTROL APPARATUS, COMMUNICATION CONTROL METHOD, AND COMMUNICATION SYSTEM

(75) Inventor: Ryota Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 124 days.

(21) Appl. No.: 14/112,318

(22) PCT Filed: Apr. 17, 2012

(86) PCT No.: PCT/JP2012/060332
§ 371 (c)(1),
(2), (4) Date: Oct. 17, 2013

(87) PCT Pub. No.: WO2012/160908
PCT Pub. Date: Nov. 29, 2012

(65) Prior Publication Data
US 2014/0044053 A1 Feb. 13, 2014

(30) Foreign Application Priority Data

May 20, 2011 (JP) ................. 2011-113675

(51) Int. Cl.
H04W 24/02 (2009.01)
H04L 5/00 (2006.01)
H04W 4/08 (2009.01)
H04W 8/18 (2009.01)
H04L 1/18 (2006.01)

(52) U.S. Cl.
CPC ........... *H04W 24/02* (2013.01); *H04L 5/0035* (2013.01); *H04L 5/0037* (2013.01); *H04W 4/08* (2013.01); *H04W 8/186* (2013.01); *H04L 1/1867* (2013.01); *H04L 5/0007* (2013.01)

(58) Field of Classification Search
None
See application file for complete search history.

(56) References Cited

U.S. PATENT DOCUMENTS 6,412,002 B1 * 6/2002 Denman et al. ............. 709/224
7,849,225 B2 * 12/2010 Schofield et al. ........... 709/250
8,554,245 B2 * 10/2013 Stewart ...................... 455/456.1
8,638,806 B2 * 1/2014 Wang et al. ................. 370/419
(Continued)

FOREIGN PATENT DOCUMENTS

JP 2010-213273 A 9/2010
JP 2011-19247 A 1/2011
(Continued)

OTHER PUBLICATIONS

U.S. Appl. No. 14/113,470, dated Oct. 23, 2013, Kimura.
(Continued)

*Primary Examiner* — Jeffrey M Rutkowski
*Assistant Examiner* — Jonathan Wood
(74) *Attorney, Agent, or Firm* — Chip Law Group

(57) ABSTRACT

There is provided a communication control apparatus including a communication controller that controls communication with other communication control apparatuses, the communication exchanging information about terminal grouping to distinguish operations to a specific wireless terminal and to other wireless terminals.

18 Claims, 33 Drawing Sheets

(56) References Cited

U.S. PATENT DOCUMENTS

| | | | |
|---|---|---|---|
| 8,681,735 B2* | 3/2014 | Mizukoshi | H04W 40/36 370/331 |
| 8,745,023 B2* | 6/2014 | Libin et al. | 707/707 |
| 2004/0120323 A1* | 6/2004 | Viikari | H04W 4/02 370/395.5 |
| 2005/0101323 A1* | 5/2005 | De Beer | 455/435.2 |
| 2005/0261970 A1* | 11/2005 | Vucina et al. | 705/16 |
| 2006/0077918 A1* | 4/2006 | Mao | H01Q 1/246 370/310 |
| 2007/0014257 A1* | 1/2007 | Strong | H04B 7/2656 370/328 |
| 2007/0209059 A1* | 9/2007 | Moore et al. | 726/2 |
| 2008/0015955 A1* | 1/2008 | Ehrman | G06Q 10/06 705/28 |
| 2008/0186933 A1* | 8/2008 | Willman et al. | 370/338 |
| 2008/0207170 A1* | 8/2008 | Khetawat | H04W 60/005 455/411 |
| 2009/0180392 A1* | 7/2009 | Greiner | H04L 47/10 370/252 |
| 2010/0056193 A1* | 3/2010 | LoGalbo | H04W 48/08 455/511 |
| 2010/0149306 A1* | 6/2010 | Gopal et al. | 348/14.09 |
| 2010/0150072 A1* | 6/2010 | Ishii | H04L 12/5695 370/328 |
| 2010/0157943 A1 | 6/2010 | Horn | |
| 2010/0157944 A1 | 6/2010 | Horn | |
| 2010/0205655 A1* | 8/2010 | Mokuya | 726/4 |
| 2010/0238858 A1 | 9/2010 | Kim et al. | |
| 2010/0265827 A1* | 10/2010 | Horn et al. | 370/241 |
| 2010/0278147 A1 | 11/2010 | Horn et al. | |
| 2010/0279687 A1 | 11/2010 | Horn et al. | |
| 2011/0009115 A1* | 1/2011 | Takai | H04W 52/12 455/423 |
| 2011/0010441 A1* | 1/2011 | Gutierrez | 709/223 |
| 2011/0041021 A1* | 2/2011 | Khoshnevis | H04L 1/1819 714/748 |
| 2011/0134875 A1* | 6/2011 | Ding | H04B 7/024 370/329 |
| 2011/0145597 A1* | 6/2011 | Yamaguchi et al. | 713/189 |
| 2011/0182200 A1* | 7/2011 | Wan | H04W 72/1289 370/252 |
| 2011/0194540 A1* | 8/2011 | Baligh | H04L 1/0071 370/337 |
| 2011/0292890 A1* | 12/2011 | Kulkarni | H04W 72/0426 370/329 |
| 2012/0039419 A1* | 2/2012 | Maddah-Ali | H04L 25/03343 375/340 |
| 2012/0167185 A1* | 6/2012 | Menezes et al. | 726/5 |
| 2012/0230189 A1* | 9/2012 | Fang et al. | 370/230 |
| 2013/0031608 A1* | 1/2013 | Alfano et al. | 726/3 |
| 2013/0295935 A1 | 11/2013 | Kim et al. | |
| 2013/0322287 A1* | 12/2013 | Bontu | H04L 1/0015 370/252 |
| 2014/0098671 A1* | 4/2014 | Raleigh et al. | 370/235 |

FOREIGN PATENT DOCUMENTS

| | | |
|---|---|---|
| JP | 2011-501525 A | 1/2011 |
| JP | 2011-87089 A | 4/2011 |
| WO | WO 2010/016607 A1 * | 2/2010 ............ H04W 36/18 |
| WO | WO 2010/125738 A1 | 11/2010 |

OTHER PUBLICATIONS

Extended European Search Report dated Dec. 10, 2014 in Patent Application No. 12789963.1.

Office Action dated Dec. 24, 2014 in Japanese Patent Application No. 2011-113675.

* cited by examiner

COMMUNICATION CONTROL APPARATUS, COMMUNICATION CONTROL METHOD, AND COMMUNICATION SYSTEM

TECHNICAL FIELD

The present invention relates to a communication control apparatus, a communication control method, a program, and a communication system.

BACKGROUND ART

Currently in 3GPP (Third Generation Partnership Project), standardization of a 4G wireless communication system (cellular system) is under way. In such a wireless communication system, it is important to improve communication capacity at a cell edge. Thus, CoMP (Coordinated Multi-Point) is under discussion as a means for improving communication capacity at a cell edge.

CoMP is a method of performing communication with user terminals in which a plurality of base stations cooperatively controls transmission/reception parameters, scheduling, or beam/antenna directivity. Effects such as stabilization of communication quality and increased communication capacities are expected from CoMP.

In a wireless communication system, it is also important to efficiently support communication traffic that arises locally. From the above perspective, the introduction of HetNet (Heterogeneous Network) is also under discussion. HetNet is a network in which large and small cells are arranged like being overlaid. According to HetNet, communication capacities in the whole area can be improved by communication traffic that arises locally, which has been hard to be covered by a large cell like a macro sell, being covered by a small cell. As base stations forming each cell, eNodeB, an RRH (Remote RadioHead) cell base station, a hot zone base station (Pico/micro cell eNB), a femto cell base station (Home eNB), and a relay apparatus (relay base station) can be assumed.

These base stations can roughly be divided into CSG (Closed Subscriber Group) cells that have access restrictions of user terminals and OSG (Open Subscriber Group) that have no access restrictions. For example, a femto cell base station is considered for operation as a CSG cell in the home and a preset user terminal can access the femto cell base station. Technology in consideration of such a CSG cell is disclosed by, for example, Patent Literature 1 and Patent Literature 2.

CITATION LIST

Patent Literature

Patent Literature 1: JP 2011-501525W
Patent Literature 2: JP 2010-213273A

SUMMARY OF INVENTION

Technical Problem

As described above, the introduction of CoMP and the CSG cell are expected in the future. However, no procedure of the CSG cell for cooperating with other base stations is currently under discussion. Therefore, realizing a combination of the CSG cell and CoMP has been difficult.

Therefore, the present disclosure proposes a novel and improved communication control apparatus to obtain a combined effect of the introduction of a communication control apparatus like a CSG cell that distinguishes between an operation to some wireless terminal and an operation to another wireless terminal and the introduction of cooperative communication like CoMP, a communication control method, a program, a communication system, and a wireless terminal.

Solution to Problem

According to the present disclosure, there is provided a communication control apparatus including a communication controller that controls communication with other communication control apparatuses, the communication exchanging information about terminal grouping to distinguish operations to a specific wireless terminal and to other wireless terminals.

According to the present disclosure, there is provided a communication control method which controls communication with other communication control apparatuses, the communication exchanging information about terminal grouping to distinguish operations to a specific wireless terminal and to other wireless terminals.

According to the present disclosure, there is provided a program causing a computer to function as a communication controller that controls communication with other communication control apparatuses, the communication exchanging information about terminal grouping to distinguish operations to a specific wireless terminal and to other wireless terminals.

According to the present disclosure, there is provided a communication system including a first communication control apparatus, and a second communication control apparatus, in which the first communication control apparatus includes a communication controller that controls communication with the second communication control apparatus, the communication exchanging information about terminal grouping to distinguish operations to a specific wireless terminal and to other wireless terminals.

Advantageous Effects of Invention

According to the present disclosure, as described above, a communication control apparatus to obtain a combined effect of the introduction of a communication control apparatus like a CSG cell that distinguishes between an operation to some wireless terminal and an operation to another wireless terminal and the introduction of cooperative communication like CoMP, a communication control method, a program, and a communication system are provided.

DESCRIPTION OF EMBODIMENTS

Figure 1:
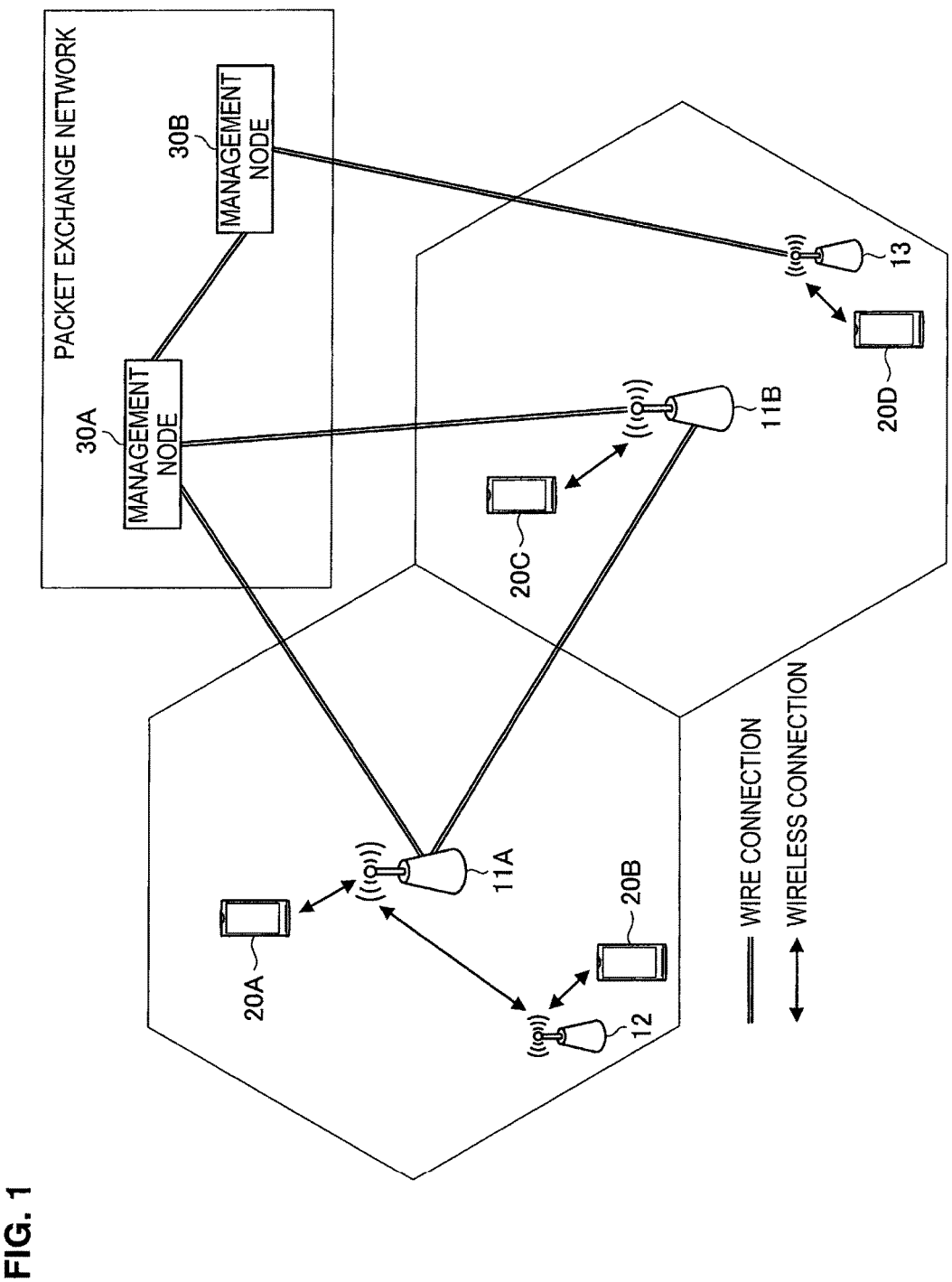
FIG. 1 is an explanatory view showing a configuration example of a wireless communication system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In this specification and the appended drawings, structural elements that have substantially the same function and structure may be distinguished by attaching different alphabets after the same reference numerals. For example, a plurality of configurations that have substantially the same function and structure may be distinguished like UE 20A, UE 20B, UE 20C when necessary. However, when there is no need to specifically distinguish each of a plurality of structural elements, only the same reference numeral is attached. For example, if there is no need to specifically distinguish UE 20A, UE 20B, and UE 20C, UE 20A, UE 20B, and UE 20C are simply called UE 20.

Figure 13:
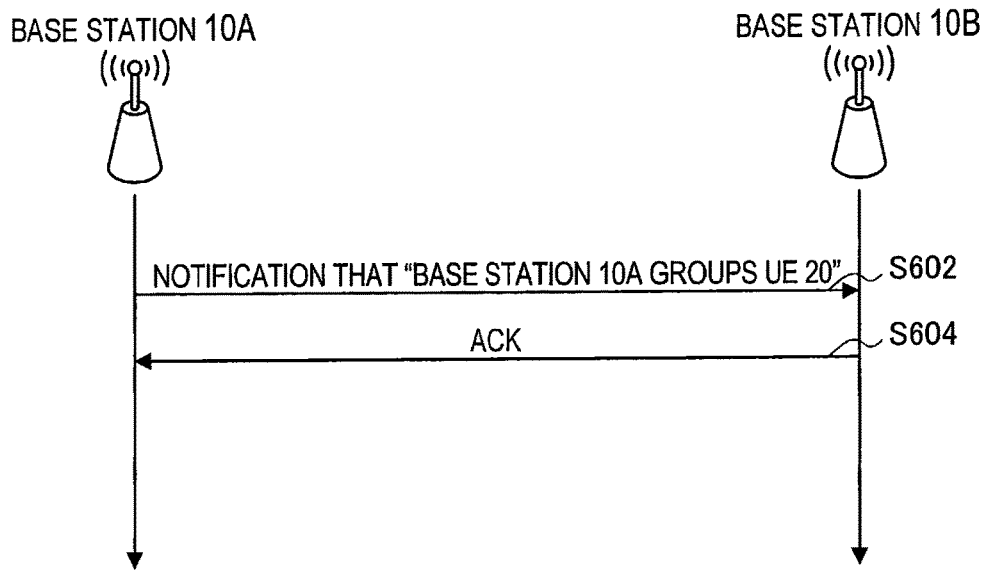
FIG. 13 is a sequence diagram showing a first communication example of information about grouping.
Figure 14:
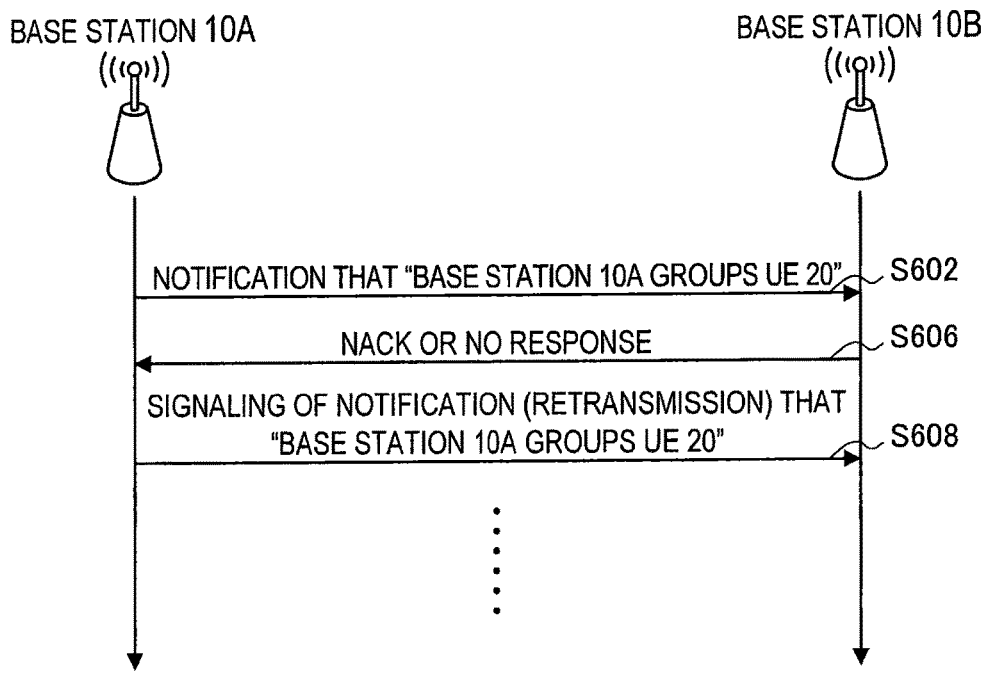
FIG. 14 is a sequence diagram showing the first communication example of information about grouping.
Figure 15:
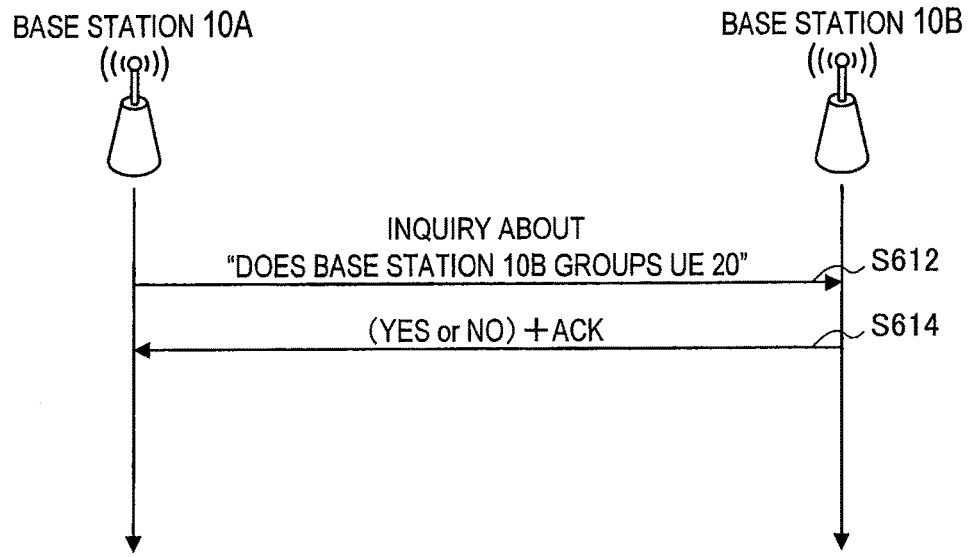
FIG. 15 is a sequence diagram showing a second communication example of information about grouping.
Figure 16:
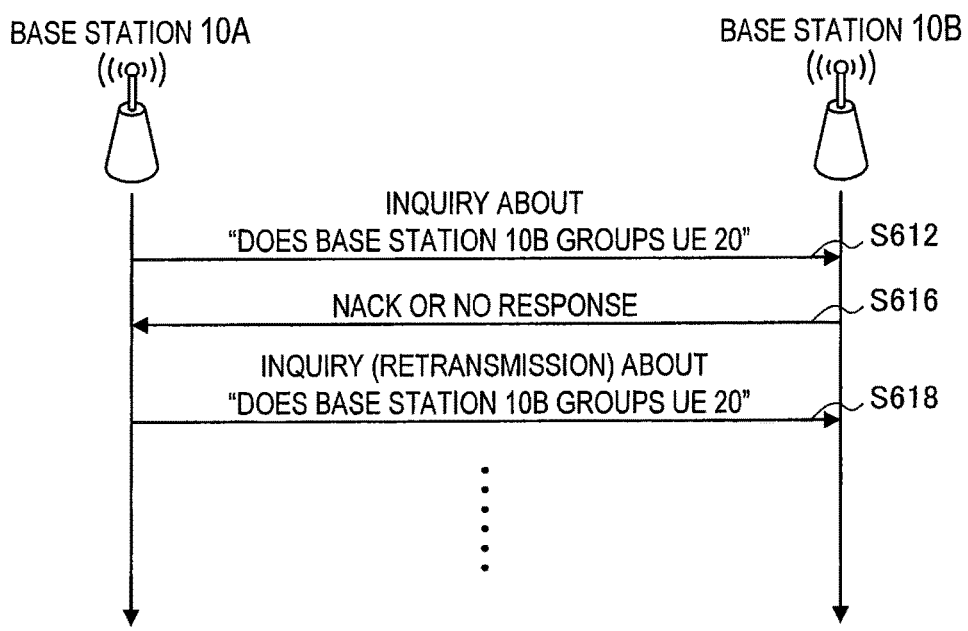
FIG. 16 is a sequence diagram showing the second communication example of information about grouping.
Figure 17:
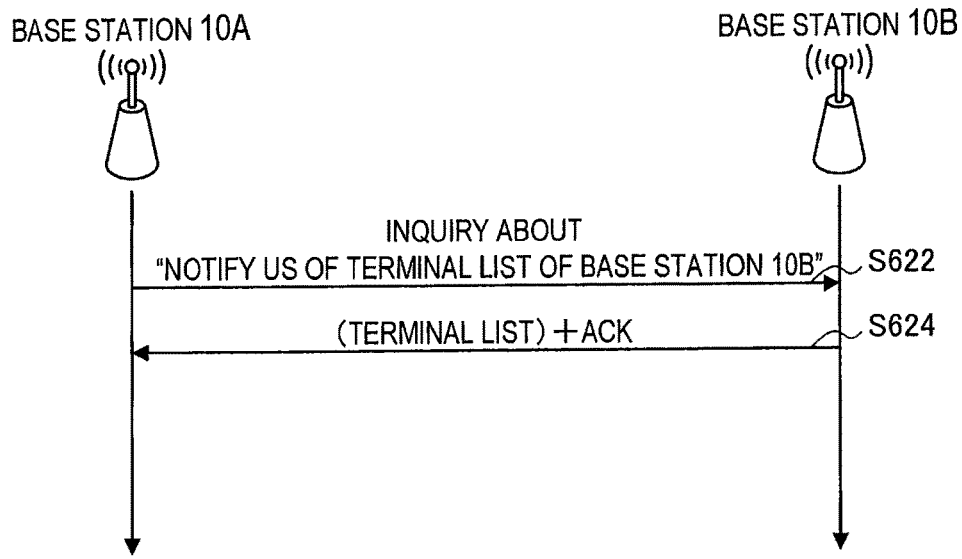
FIG. 17 is a sequence diagram showing a third communication example of information about grouping.
Figure 18:
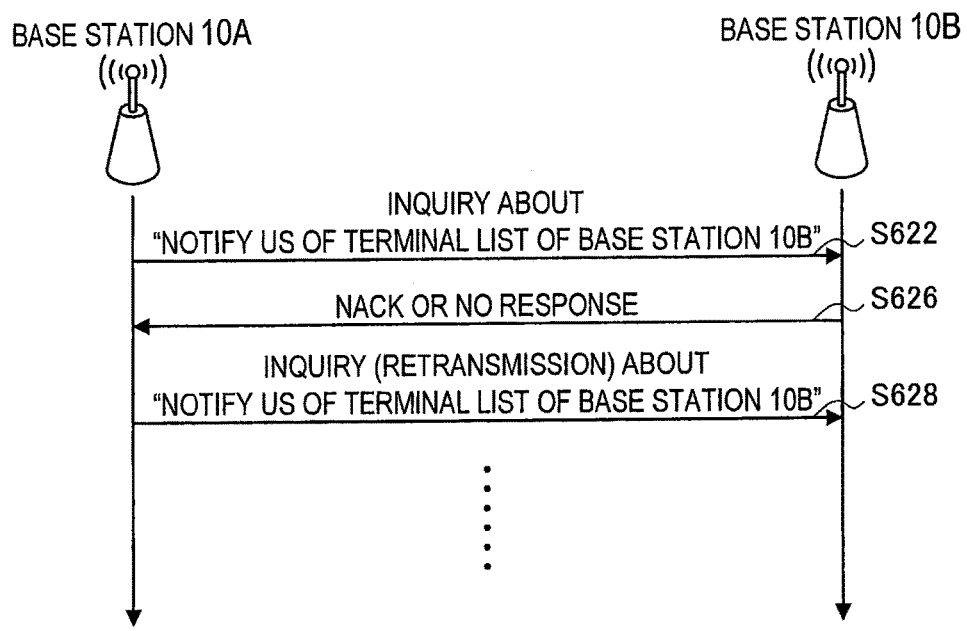
FIG. 18 is a sequence diagram showing the third communication example of information about grouping.
Figure 19:
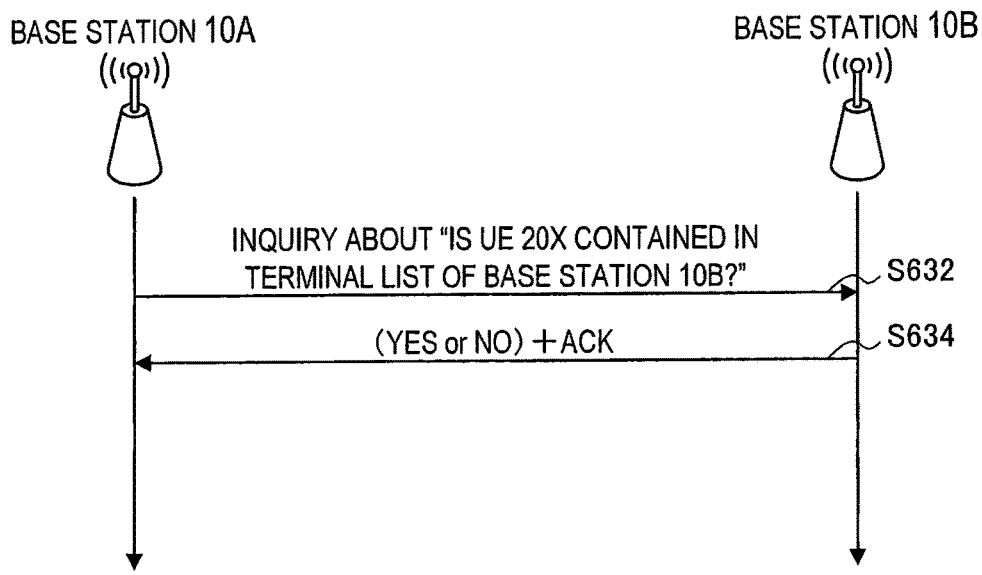
FIG. 19 is a sequence diagram showing a fourth communication example of information about grouping.
Figure 20:
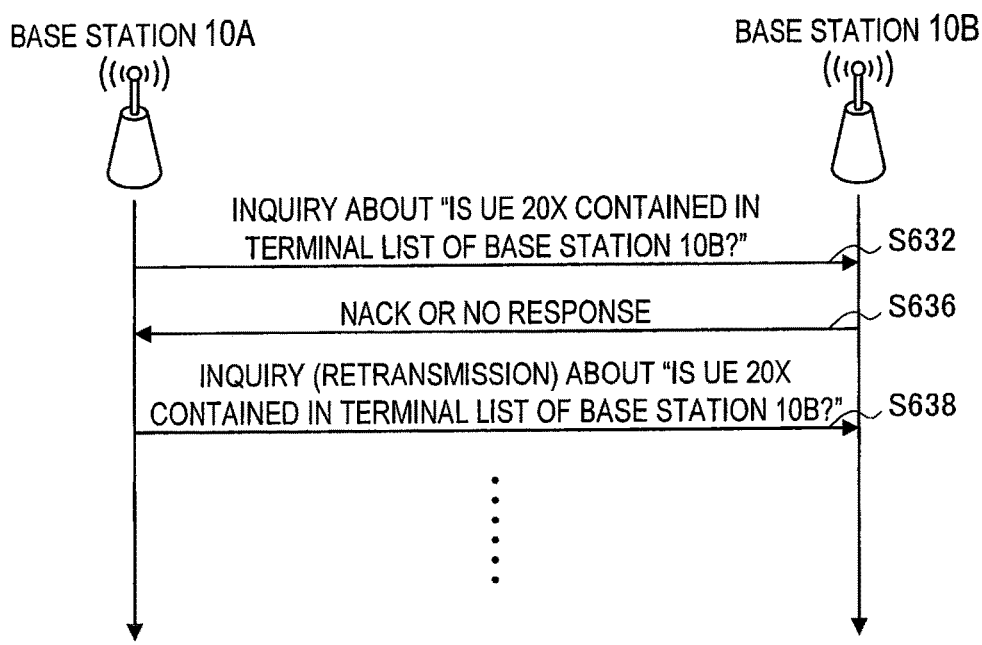
FIG. 20 is a sequence diagram showing the fourth communication example of information about grouping.
Figure 21:
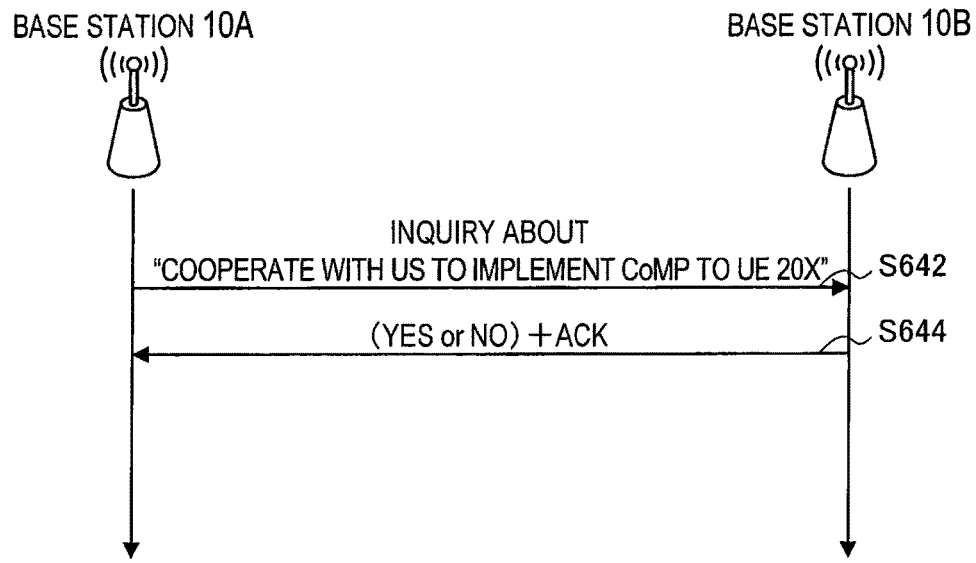
FIG. 21 is a sequence diagram showing a fifth communication example of information about grouping.
Figure 22:
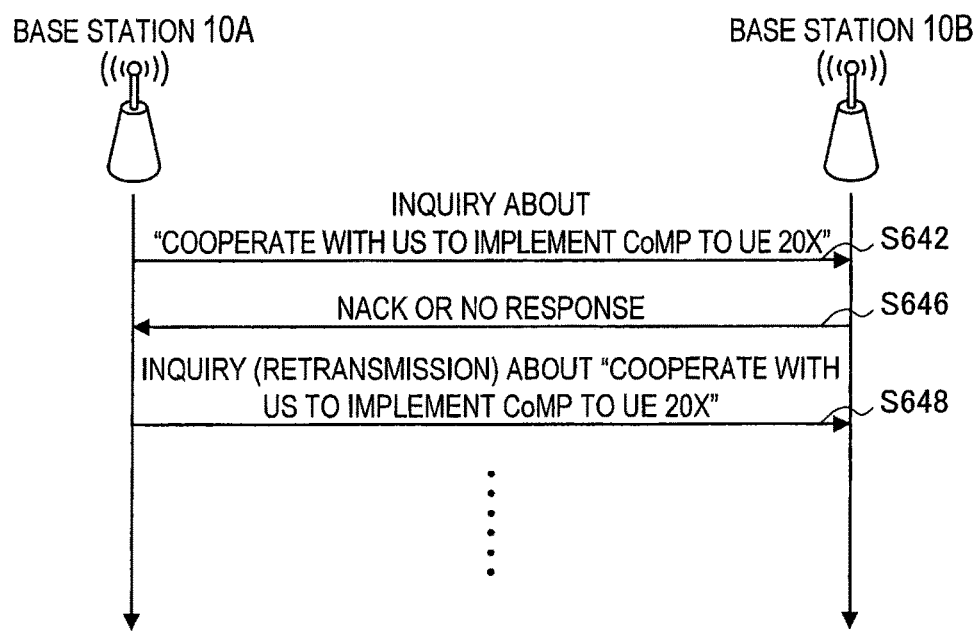
FIG. 22 is a sequence diagram showing the fifth communication example of information about grouping.
Figure 23:
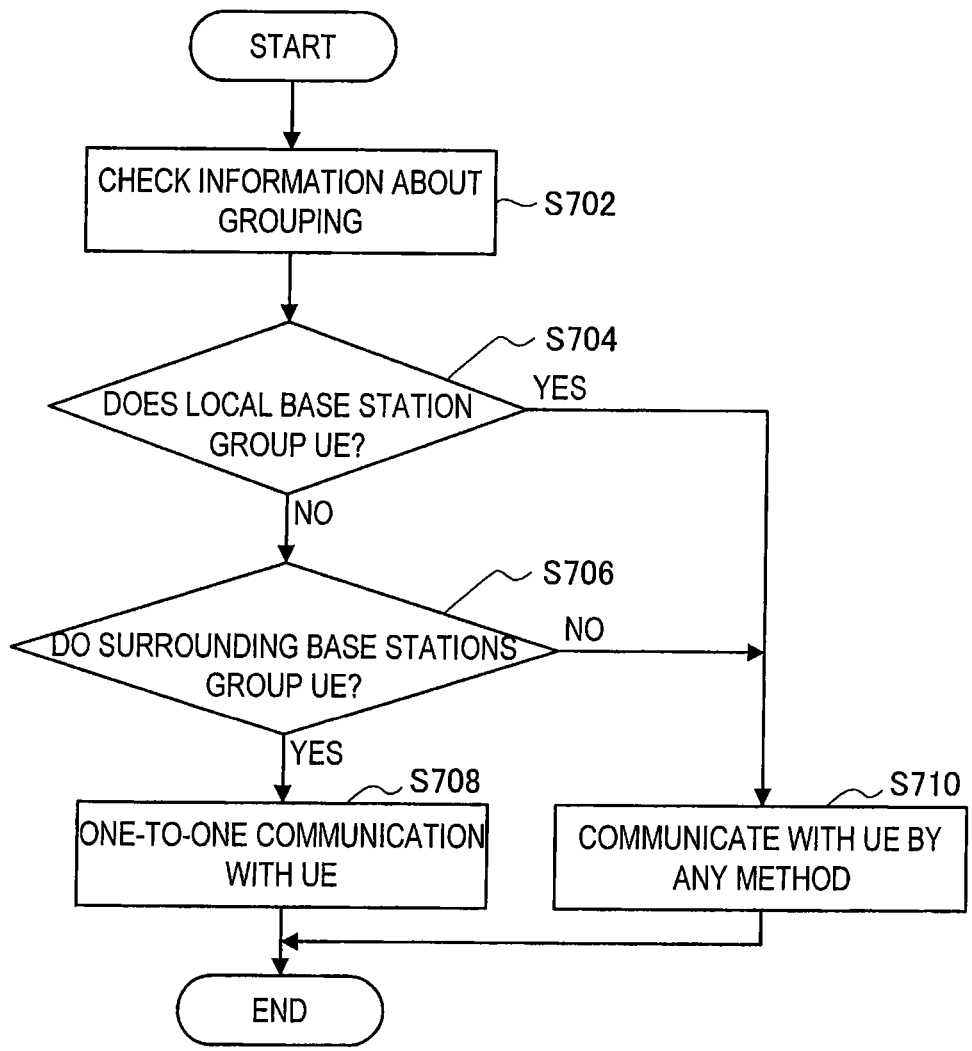
FIG. 23 is a flow chart showing a first judgment example about CoMP.
Figure 24:
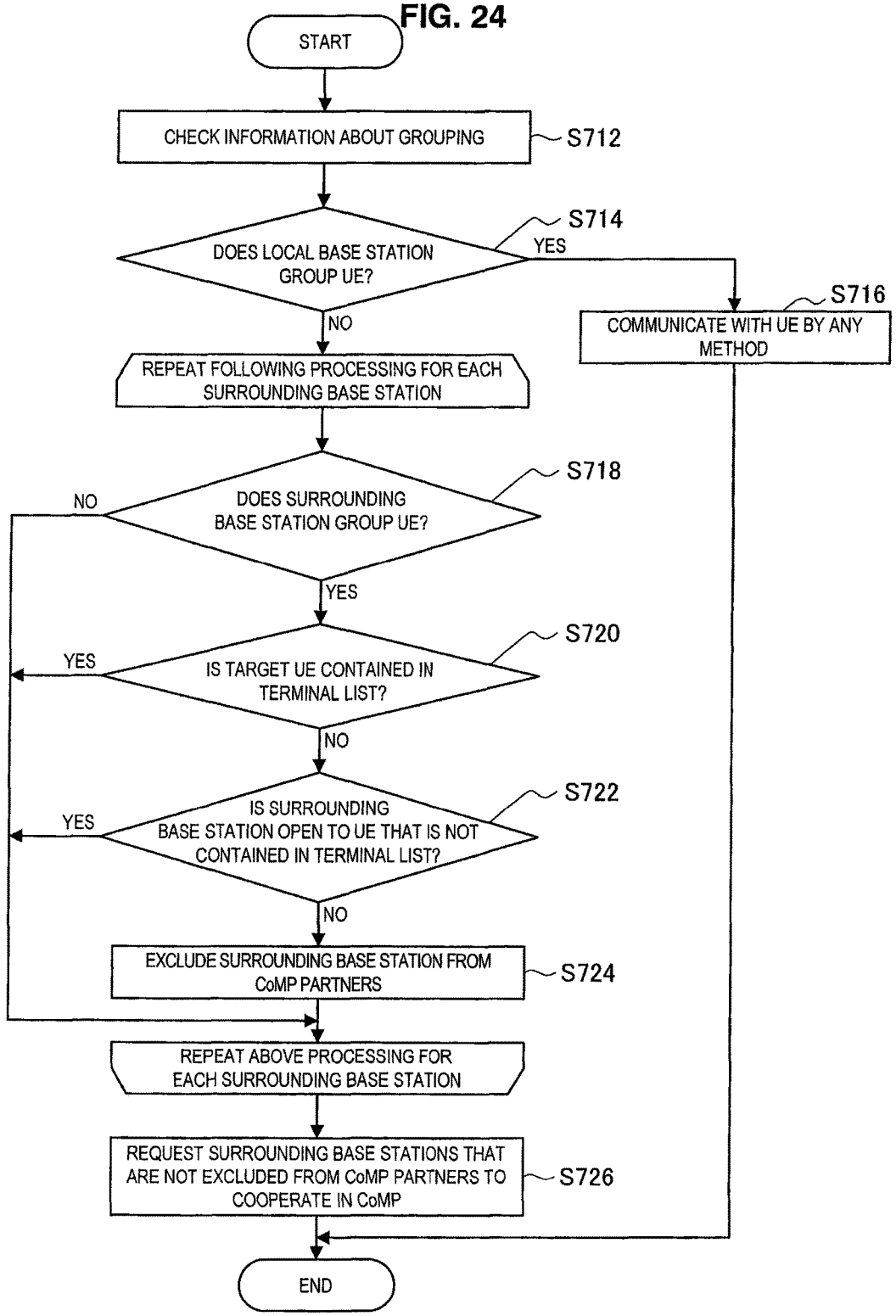
FIG. 24 is a flow chart showing a second judgment example about CoMP.
Figure 25:
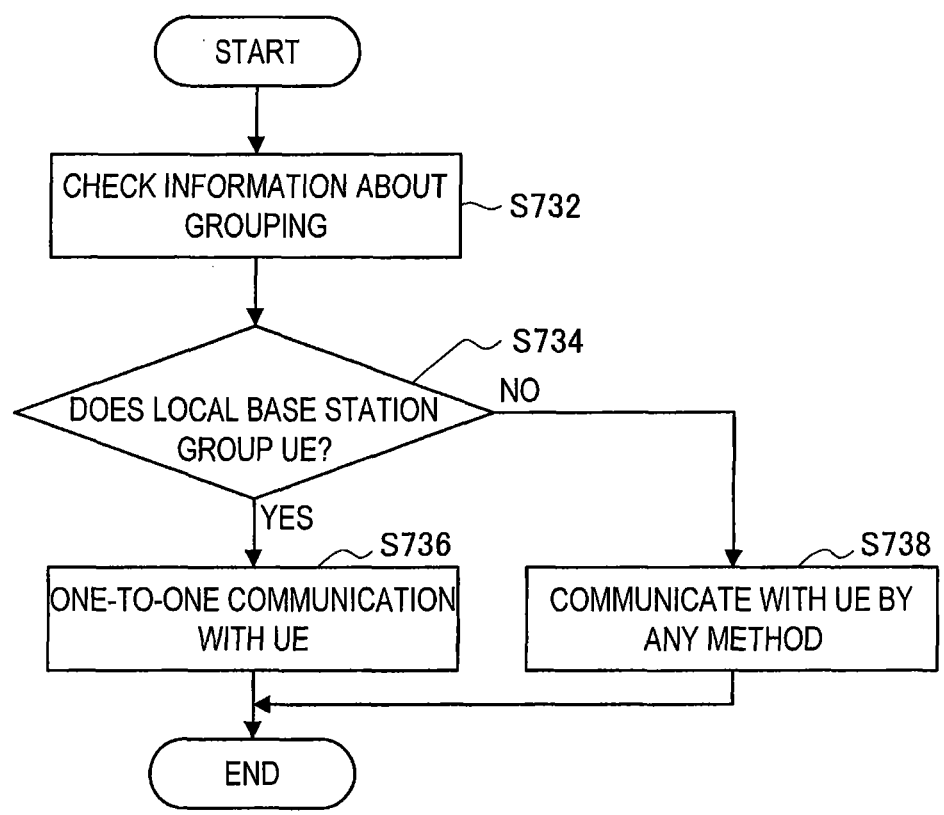
FIG. 25 is a flow chart showing a third judgment example about CoMP.
Figure 26:
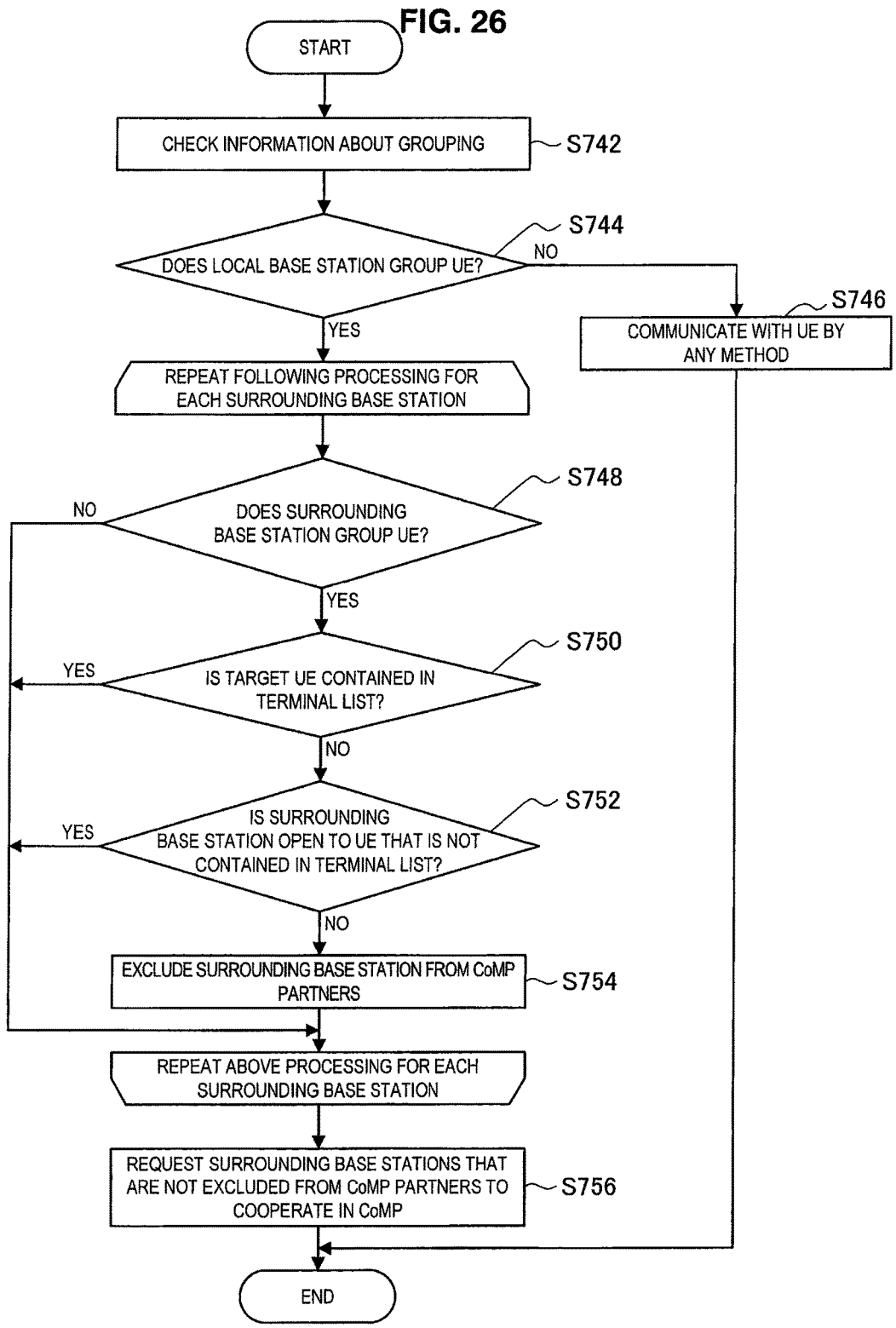
FIG. 26 is a flow chart showing a fourth judgment example about CoMP.

The present disclosure will be described in the order of items shown below:

1. Basic Configuration of Wireless Communication System
  1-1. Grouping of UE
    (Grouping for access restrictions)
    (Grouping for priority connection)
  1-2. CoMP
    (Cooperative transmission)
    (Cooperative reception)
    (Cooperative scheduling)
2. First Embodiment
  2-1. Configuration of Base Station
  2-2. Operation of Base Station
    —Communication of information about grouping—
    (First communication example: FIGS. 13, 14)
    (Second communication example: FIGS. 15, 16)
    (Third communication example: FIGS. 17, 18)
    (Fourth communication example: FIGS. 19, 20)
    (Fifth communication example: FIGS. 21, 22)
    —Judgment whether to implement CoMP—
    (First judgment example: FIG. 23)
    (Second judgment example: FIG. 24)
    (Third judgment example: FIG. 25)
    (Fourth judgment example: FIG. 26)
    —Procedure for performing CoMP—
3. Second Embodiment
  3-1. Use Case of Second Embodiment
  3-2. Configuration and Operation of Base Station 3-3. Configuration and Operation of Management Node
3-4. Supplementary Remarks
4. Summary <<1. Basic Configuration of Wireless Communication System>>

First, a basic configuration of a wireless communication system according to an embodiment of the present disclosure will be described with reference to FIG. 1. FIG. 1 is an explanatory view showing a configuration example of a wireless communication system according to an embodiment of the present disclosure. As shown in FIG. 1, a wireless communication system according to an embodiment of the present disclosure includes eNodeB 11, a relay node 12, a femto cell base station 13, UE (User Equipment) 20, and a management node 30.

The eNodeB 11 controls communication between the relay node 12 and the UE 20 present inside a macro cell formed by the eNodeB 11. For example, eNodeB 11A manages scheduling information to communicate with UE 20A present in the macro cell and communicates with the UE 20A according to the scheduling information. Also, the eNodeB 11A manages scheduling information to communicate with the relay node 12 present in the macro cell and manages scheduling information for the relay node 12 and the UE 20B to communicate.

Each of the eNodeB 11 is mutually connected via a wire communication line called an X2 interface. Each of the eNodeB 11 is also connected to a management node 30A via a wire communication line called an S1 interface. Each of the eNodeB 11 can communicate with other eNodeB or the management node 30 using these interfaces.

The relay node 12 relays communication between the eNodeB 11 and the UE 20 according to scheduling information managed by the eNodeB 11. More specifically, the relay node 12 receives a signal transmitted from the eNodeB 11 in a down link and transmits an amplified signal to the UE 20 using the frequency-time according to scheduling information. By performing such a relay, when compared with a case when a signal is directly transmitted from the eNodeB 11 to the UE 20 near a cell edge, the relay node 12 can make the signal-to-noise ratio larger.

The femto cell base station 13 is a base station whose maximum transmission power is smaller than that of the eNodeB 11 and forms a cell smaller than a macro cell. The femto cell base station 13 is assumed to be arranged in the home or office and forms, for example, CSG (Closed Subscriber Group) accessible only from the UE 20 of the user in the home.

The femto cell base station 13 is connected to a management node 30B and can communicate with the eNodeB 11 via a packet exchange network like ADSL. Incidentally, the femto cell base station 13 may communicate with the eNodeB 11 via a wireless link.

The management node 30A is connected to each of the eNodeB 11 via a backbone network. The management node 30A may also have a function as MME (Mobile Management Entity) or a function as Serving Gateway. The management node 30A receives management information indicating the state of a macro cell formed by each of the eNodeB 11 from each of the eNodeB 11 and controls communication in the macro cell formed by each of the eNodeB 11 based on the management information. Incidentally, the function of the management node 30A may be implemented by being distributed over a plurality of physically separated configurations. Similarly, the management node 30B is connected to the femto cell base station 13 and manages communication by the femto cell base station 13.

The UE 20 is, as described above, a wireless terminal that communicates with base stations like the eNodeB 11, the relay node 12, and the femto cell base station 13. Data transmitted/received by the UE 20 includes audio data, music data such as music, lectures, and radio programs, still image data such as photos, documents, pictures, and diagrams, and dynamic image data such as video, TV programs, video programs, and game images. FIG. 1 shows an example in which the UE 20 is a smartphone, but the UE 20 may be any information processing apparatus including a wireless communication function like a mobile phone, PC (Personal Computer), mobile music reproducing apparatus, mobile game machine, home music reproducing apparatus, and home game machine.

According to a wireless communication system in an embodiment of the present disclosure, as described above, a network called HetNet in which large and small cells are arranged by being overlaid on each other. According to HetNet, communication capacities in the whole area can be improved by communication traffic that arises locally, which has been hard to be covered by a large cell like a macro sell, being covered by a small cell.

Hereinafter, communication control apparatuses like the eNodeB 11, the relay node 12, and the femto cell base station 13 forming HetNet may generically be called base stations 10 when necessary. However, the base station 10 is not limited to the eNodeB 11, the relay node 12, and the femto cell base station 13. For example, the base station 10 may be a hot zone base station or RRH (Remote RadioHead) cell base station.

The hot zone base station is a base station whose maximum transmission power is smaller than that of the eNodeB 11. The hot zone base station communicates with the eNodeB 11 by using an interface like X2 or S1 of the backbone network. The hot zone base station forms OSG (Open Subscriber Group) accessible from any of the UE 20.

The RRH cell base station is connected to the eNodeB 11 via an optical fiber. Thus, the eNodeB 11 can transmit a signal to the RRH cell base station arranged in a geographically different location via an optical fiber to cause the RRH cell base station to wirelessly transmit the signal. For example, only an RRH cell base station close to the location of the UE 20 may be used. A control system function is implemented in the eNodeB 11 and the eNodeB 11 selects the optimum transmission form in accordance with the distribution of the UE 20.

<1-1. Grouping of UE>

The eNodeB 11 described above is open to all the UE 20 and permits connection from all the UE 20. With a macro cell being expanded areawide by the eNodeB 11 described above, the UE 20 can communicate in a wide range.

On the other hand, a base station like the femto cell base station 13 that groups the UE 20 and permits access only from the specific UE 20. Such a base station is called a CSG (Closed Subscriber Group) cell. For example, by adding the UE 20 of an employee of an office in which a CSG cell is installed or of a member of the family to the CSG list, only the UE 20 contained in the CSG list can access the CSG cell. With the introduction of the CSG cell, the CSG cell is expected to realize high-quality and high-speed communication by preventing congestion of access by the UE 20.

The base station 10 can also give priority to the specific UE 20 for connection over the other UE 20 by grouping of the UE 20. Accordingly, when building a communication system, the allocation of communication resources to each time/location can be made efficient to improve communication quality of a specific user or a specific area. An example of permitting access of only the specific UE 20 by grouping and an example of allowing priority connection of the specific UE 20 by grouping will be concretely described.

(Grouping for Access Restrictions)

Figure 2:
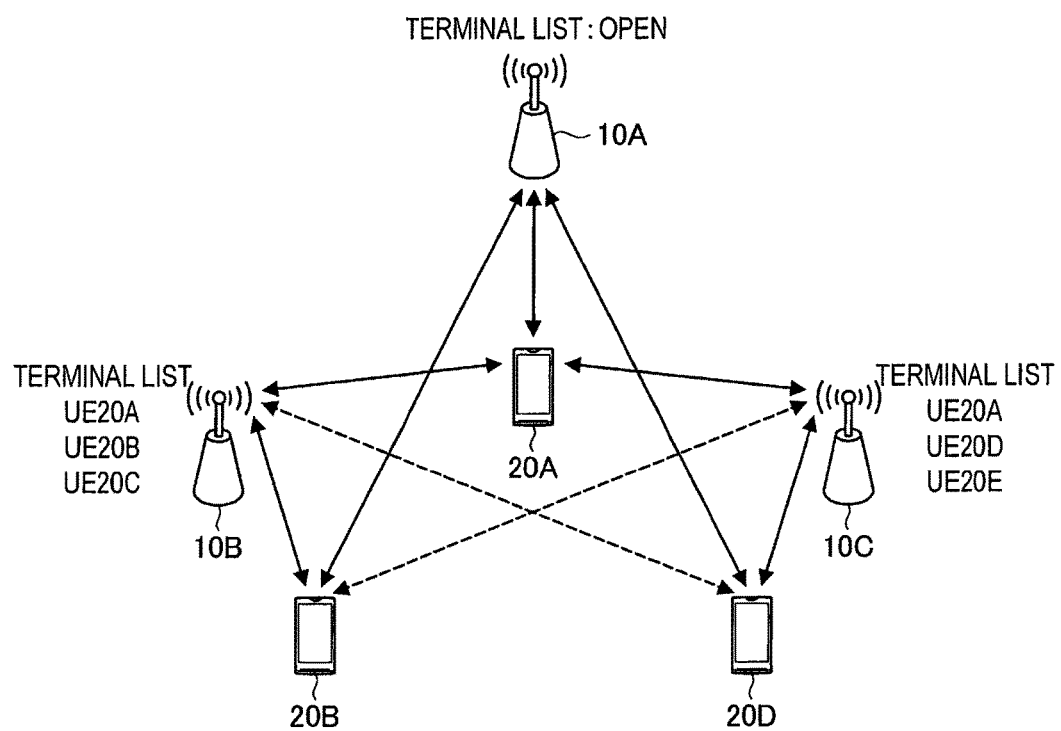
FIG. 2 is an explanatory view showing an example of permitting access of only specific UE by grouping.

FIG. 2 is an explanatory view showing an example of permitting access of only specific UE by grouping. A case in which, as shown in FIG. 2, a base station 10A does not group the UE 20 and base stations 10B, 10C group the UE 20. The base stations 10B, 10C have terminal lists showing the UE 20 permitted to access and the terminal list of the base station 10B contains the UE 20A, UE 20B, UE 20C and the terminal list of the base station 10C contains the UE 20A, UE 20D, UE 20E.

In this case, the base station 10A can communicate with any of the UE 20A, UE 20B, UE 20D. On the other hand, the base station 10B can communicate with the UE 20A, UE 20B, but cannot communicate with the UE 20D because the UE 20D is not contained in the terminal list. Similarly, the base station 10C can communicate with the UE 20A, UE 20D, but cannot communicate with the UE 20B because the UE 20B is not contained in the terminal list.

Figure 3:
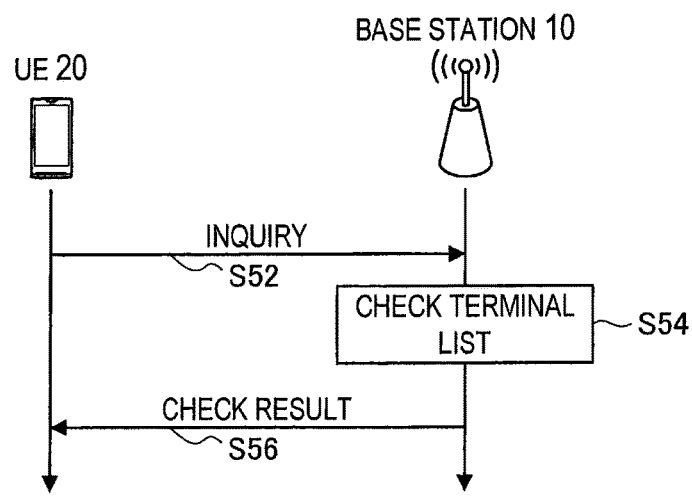
FIG. 3 is an explanatory view showing an example of a protocol related to access to a base station that groups UE.

FIG. 3 is an explanatory view showing an example of a protocol related to access to the base station 10 that groups the UE 20. As shown in FIG. 3, when the UE 20 makes an inquiry about the terminal list at the base station 10 to make sure whether the base station 10 is connectable (S52), the base station 10 checks whether the UE 20 is contained in the terminal list (S54). Then, the base station 10 notifies the UE 20 of the check result (S56) or takes action according to grouping of the UE 20 for the UE 20.

Figure 4:
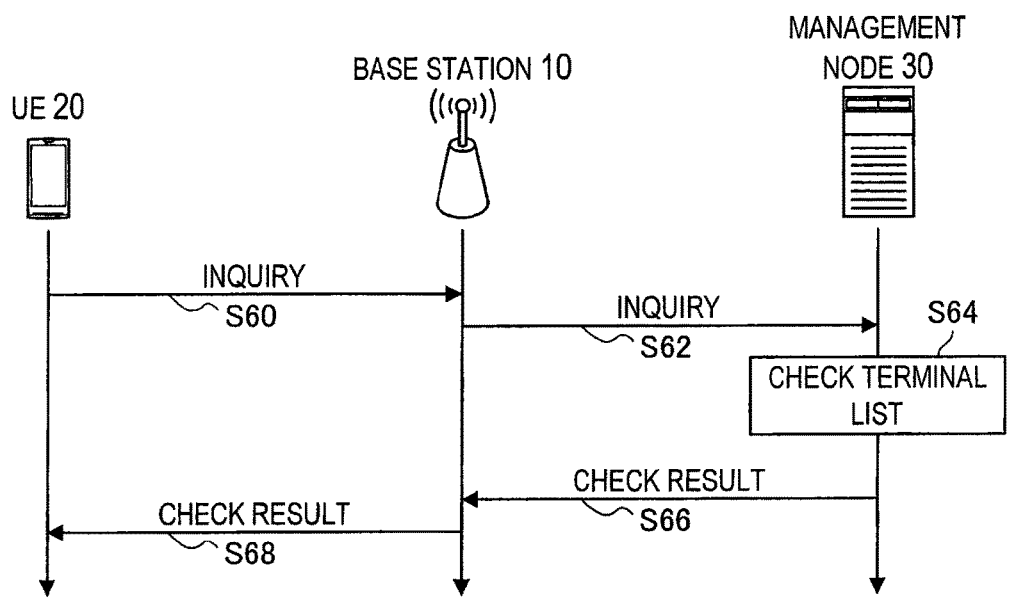
FIG. 4 is an explanatory view showing another example of the protocol related to access to the base station that groups UE.

FIG. 4 is an explanatory view showing another example of the protocol related to access to the base station that groups UE 20. An example in which the base station 10 holds a terminal list is described in FIG. 3, but as shown in FIG. 4, the management node 30 may hold a terminal list or both of the base station 10 and the management node 30 may hold a terminal list.

More specifically, when the UE 20 makes an inquiry about the terminal list at the base station 10 to make sure whether the base station 10 is connectable (S60), the base station 10 transfers the inquiry to the management node 30 (S62). Then, the management node 30 checks whether the UE 20 is contained in the terminal list (S64) and transmits the check result to the base station 10 (S66). The base station 10 transfers the check result received from the management node 30 to the UE 20 (S68).

Though an illustration is omitted in FIG. 4, a physical node may further be present between the base station 10 and the management node. In this case, an interposing physical node plays the role of transferring an inquiry or a check result.

(Grouping for Priority Connection)

By grouping the UE 20, as described above, priority connection of the specific UE 20 can be realized. For example, the base station 10 can realize priority connection by allocating more communication resources (such as the time, frequency, code, and space) to the specific UE 20 than to other UE. This point will be described more concretely below with reference to FIG. 5.

Figure 5:
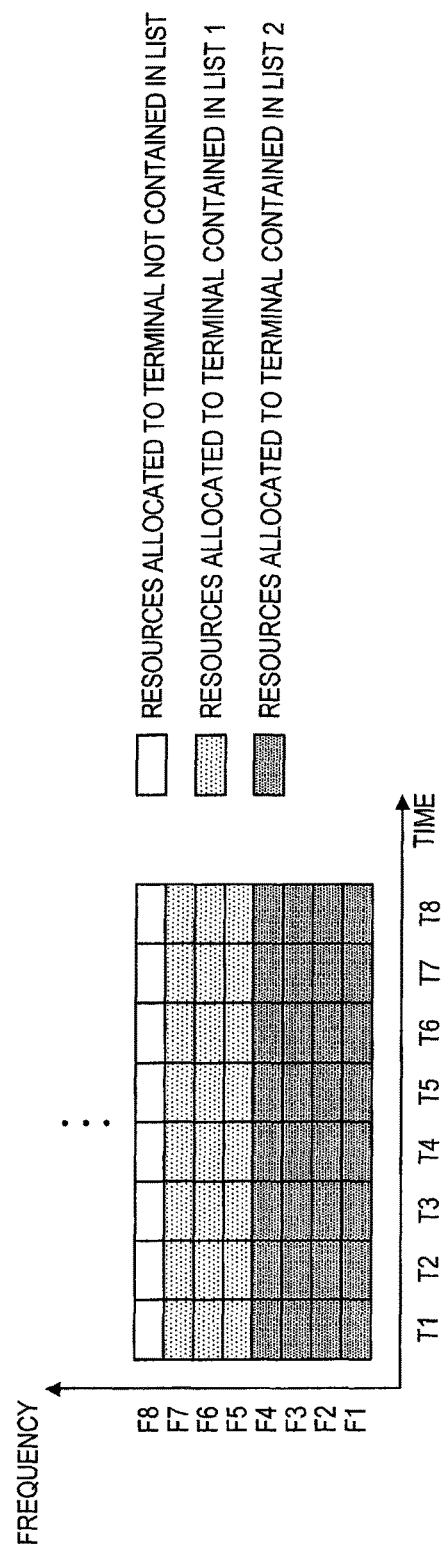
FIG. 5 is an explanatory view showing the allocation of resources by the base station that groups.

FIG. 5 is an explanatory view showing the allocation of resources by the base station 10 that groups UE. The base station 10 shown in FIG. 5 groups the UE 20 into the UE 20 contained in a list 1, the UE 20 contained in a list 2, and the other UE 20 and provides communication resources for each group.

In the example shown in FIG. 5, the base station 10 provides frequencies F1 to F4 to the group of the UE 20 contained in the list 2, frequencies F5 to F7 to the group of the UE 20 contained in the list 1, and a frequency F8 to the other UE 20. Thus, the highest priority is given to the UE 20 contained in the list 2, the next highest priority is given to the UE 20 contained in the list 1, and the lowest priority is given to the other UE 20.

FIG. 5 shows an example in which communication resources in the frequency direction are changed for each group, but other communication resources in the time direction can also be changed for each group. Thus, with a plurality of terminal lists held by the base station 10, finer communication content in a cell formed by the base station 10 can be controlled.

<1-2. CoMP>

Subsequently, CoMP communication performed by the base station 10 according to an embodiment of the present disclosure will be described. The CoMP communication is cooperative communication in which a plurality of the base stations 10 is coordinated to perform communication with the UE 20. Examples of the CoMP communication include cooperative transmission, cooperative reception, and cooperative scheduling. Each type of the CoMP communication will be described below more concretely.

(Cooperative Transmission)

Cooperative transmission is a method of transmitting information intended for the target UE 20 from a plurality of the base stations 10 to the target UE 20. In this case, the plurality of base stations 10 uses the same communication resources (such as the frequency, time, space, and code) at least partially. In addition, the plurality of base stations 10 adjusts transmission parameters such as the error correcting method of information to be transmitted, error correction coding rate, modulation method, and weighting between the base stations 10. Accordingly, an effect of the spatial transmission diversity by the plurality of base stations 10 (improvement of reception quality) or an effect of spatial multiplexing by different information being transmitted by the plurality of base stations 10 using the same communication resources (improvement of transmission rate) can be expected.

Figure 6:
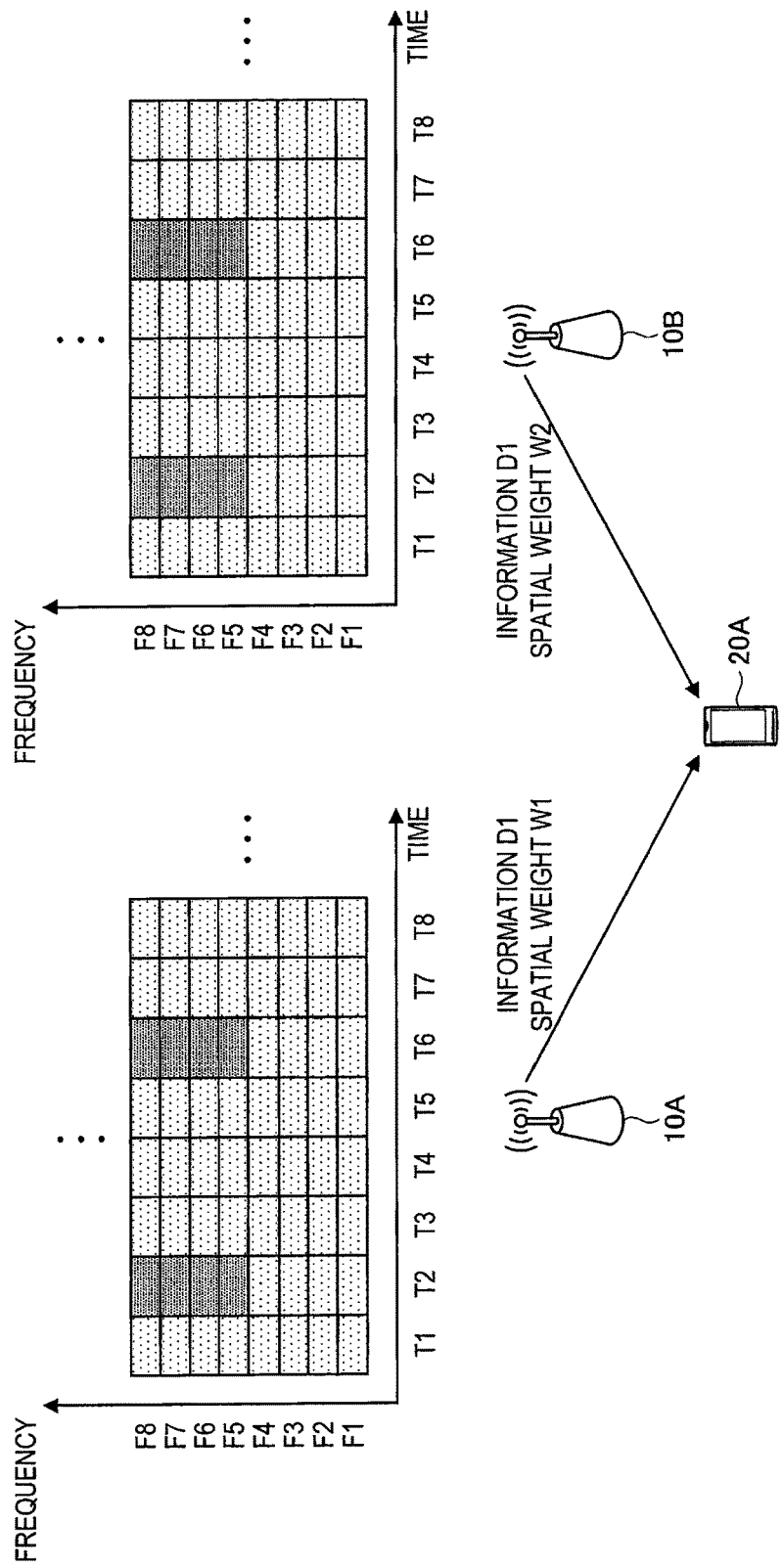
FIG. 6 is an explanatory view showing an example of cooperative transmission to obtain a spatial diversity effect by two base stations.

FIG. 6 is an explanatory view showing an example of cooperative transmission to obtain a spatial diversity effect by the two base stations 10. When cooperative transmission is performed to obtain a spatial diversity effect, as shown in FIG. 6, the base stations 10A, 10B transmit the same information to the UE 20A using the same frequency and time resources, but different spatial resources. More specifically, the base station 10A uses a spatial weight W1 and the base station 10B uses a spatial weight W2 to transmit the same information D1. The spatial weights W1, W2 are desirably selected so that a combined signal can obtain a diversity effect when signals are received by the UE 20A. The base stations 10A, 10B may use a communication network like a packet exchange network as shown in FIG. 1 or a wire channel to select resources and to share and control the same information between the base stations 10.

Figure 7:
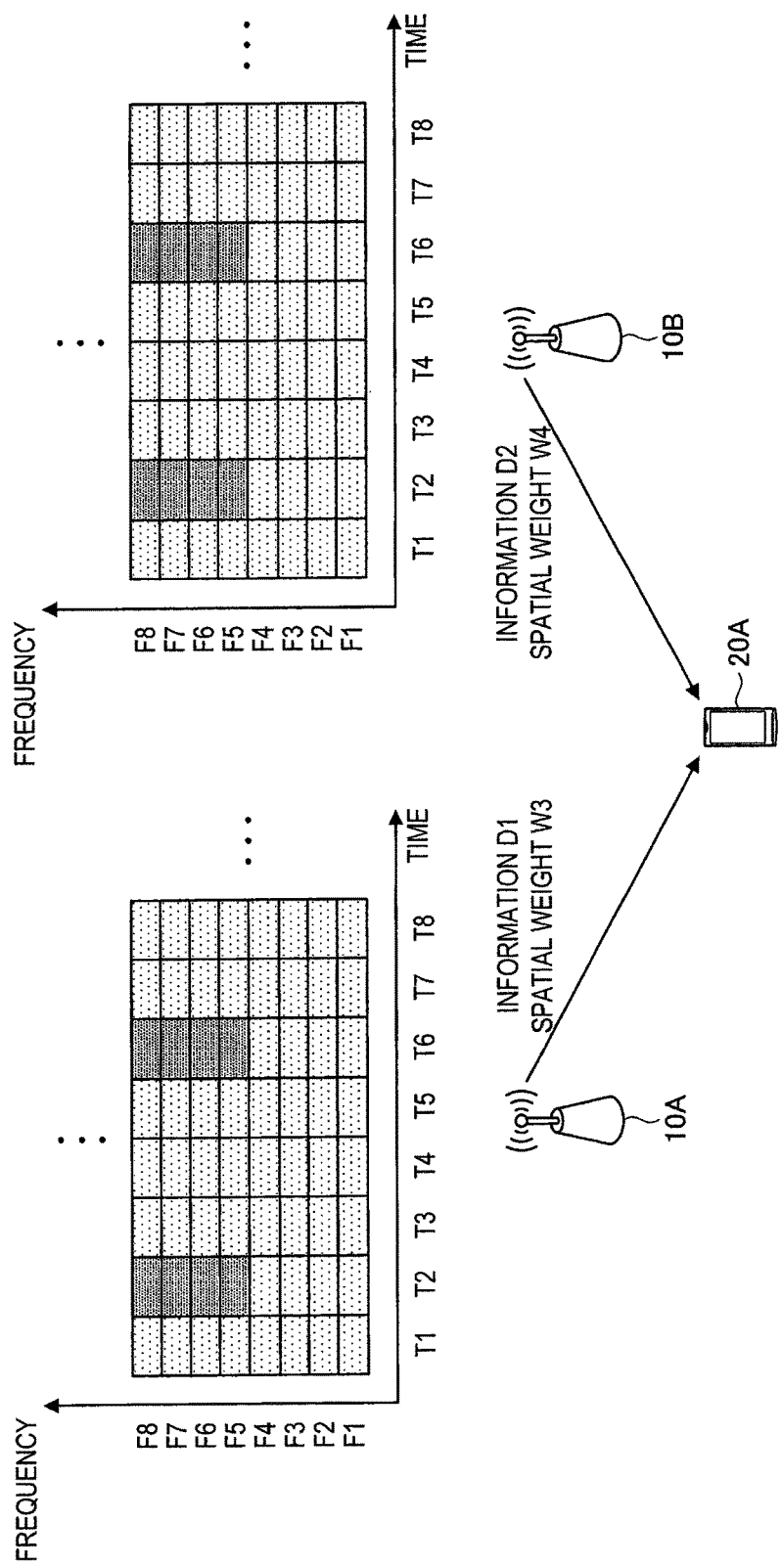
FIG. 7 is an explanatory view showing an example of cooperative transmission to obtain a spatial multiplexing effect by two base stations.

FIG. 7 is an explanatory view showing an example of cooperative transmission to obtain a spatial multiplexing effect by the two base stations 10. When cooperative transmission is performed to obtain a spatial multiplexing effect, as shown in FIG. 7, the base stations 10A, 10B transmit different information to the UE 20A using the same frequency and time resources, but different spatial resources. The base stations 10A, 10B may use, like the example shown in FIG. 6, a communication network like a packet exchange network or a wire channel to select resources and to share and control information transmitted from the respective base station between the base stations 10.

According to the cooperative transmission by the two base stations 10, as described above, when compared with a case when information is transmitted to the UE 20A by the base station 10 alone, higher transmission rate (for example, a double transmission rate) can be obtained.

(Cooperative Reception)

Cooperative reception is a method of decoding information by a signal transmitted from the target UE 20 being received by a plurality of the base stations 10 and the received signal being exchanged between the plurality of base stations 10 or the received signal being gathered at a predetermined place. In this case, the plurality of base stations 10 allocates the same communication resources (such as the frequency, time, space, and code) at least partially to the UE 20. Accordingly, an effect of spatial reception diversity by the plurality of base stations 10 is obtained and thus, for example, reception quality of an up link of the communication system can be improved.

Figure 8:
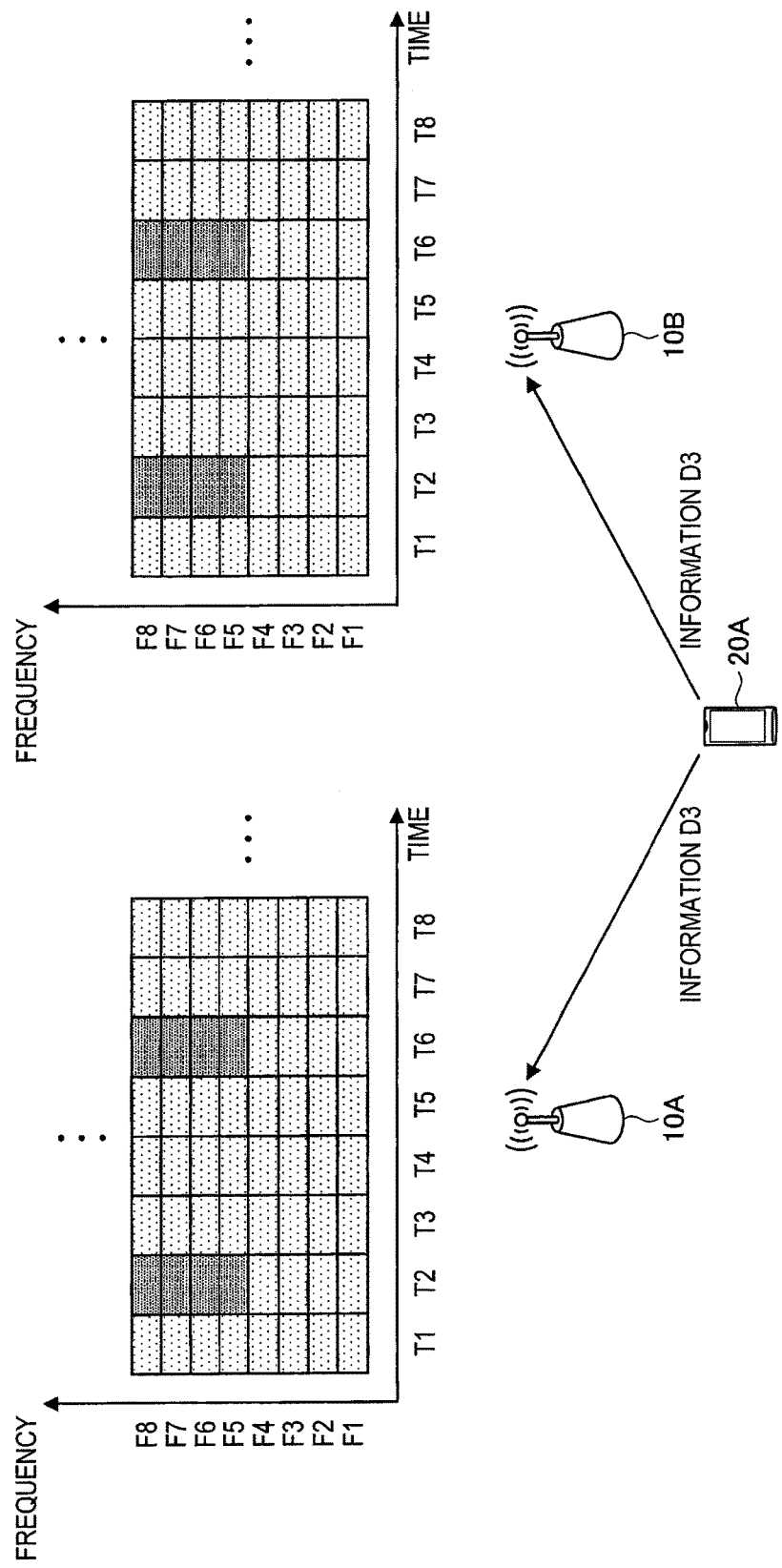
FIG. 8 is an explanatory view showing an example of cooperative reception to obtain the spatial diversity effect by two base stations.

FIG. 8 is an explanatory view showing an example of cooperative reception to obtain the spatial diversity effect by the two base stations 10. When cooperative reception is performed to obtain a spatial diversity effect, as shown in FIG. 8, the base stations 10A, 10B allocate the same frequency and time resources to the UE 20A and the UE 20A uses allocated resources to transmit a signal. The base stations 10A, 10B attempt to decode information by transferring respective received signals to a predetermined location or exchanging received signals between the base station 10A and the base station 10B. Thus, by using received signals of a plurality of the base stations 10 to decode information, reception quality can be improved. Incidentally, information may be decoded by an apparatus other than the base station 10A and the base station 10B. The UE 20A may transmit information by using spatial weights.

(Cooperative Scheduling)

Cooperative scheduling is a method of adjusting the allocation of resources such that allocated resources to the UE 20 by each of a plurality of the base stations 10 performing communication with the target UE 20 are at least partially different. Accordingly, signals from the plurality of base stations 10 are orthogonal in at least a portion of communication resources and thus, the reduction of interference on the side of the UE 20 can be expected.

Figure 9:
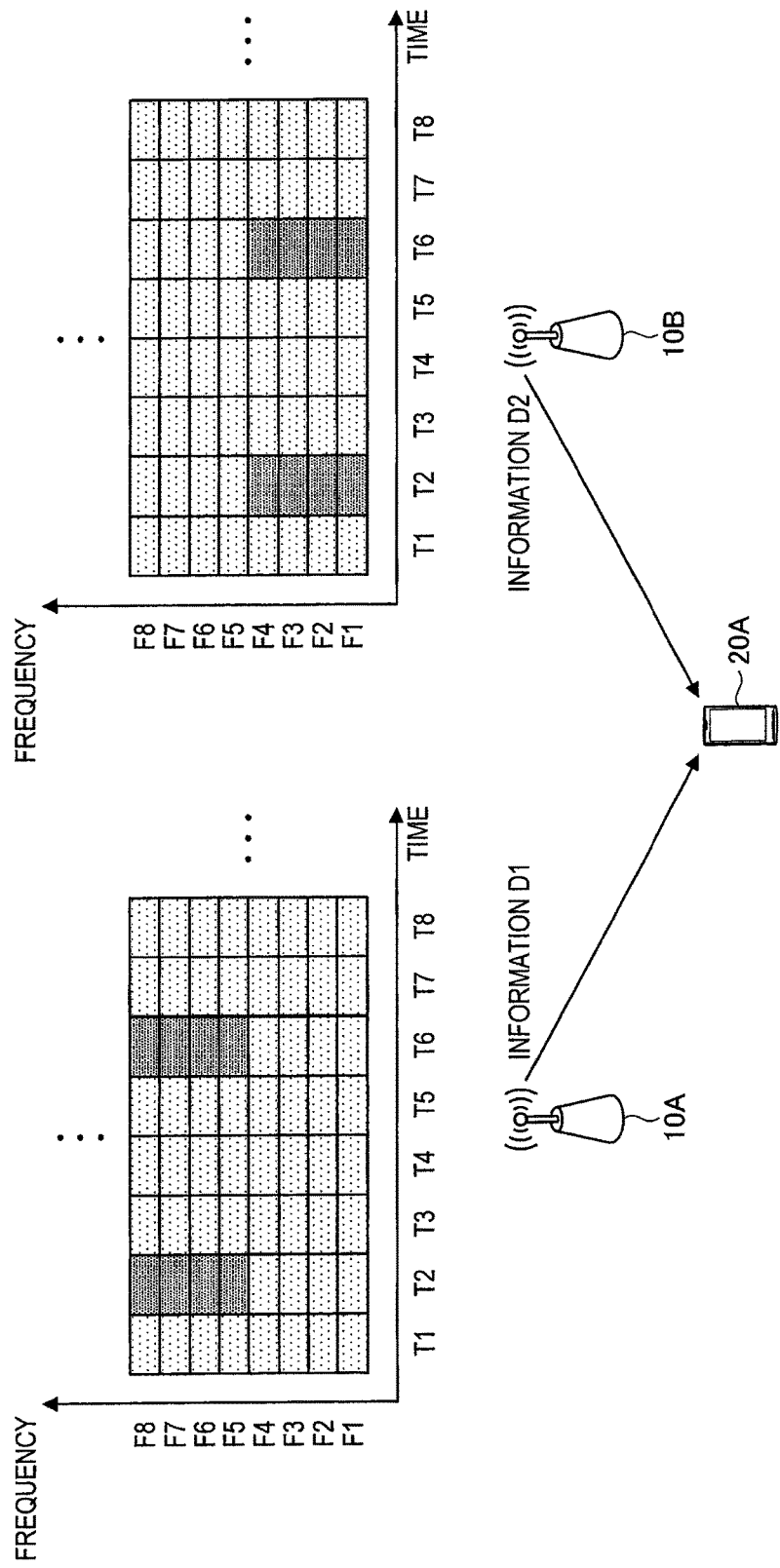
FIG. 9 is an explanatory view showing an example of cooperative scheduling in a frequency direction by two base stations.

FIG. 9 is an explanatory view showing an example of cooperative scheduling in a frequency direction by the two base stations 10. When cooperative scheduling in the frequency direction is performed, as shown in FIG. 9, the base stations 10A, 10B transmit different information using the same time resources, but different frequency resources. Accordingly, signals from the base station 10A and the base station 10B are orthogonal in the UE 20A and thus, interference can be reduced.

Figure 10:
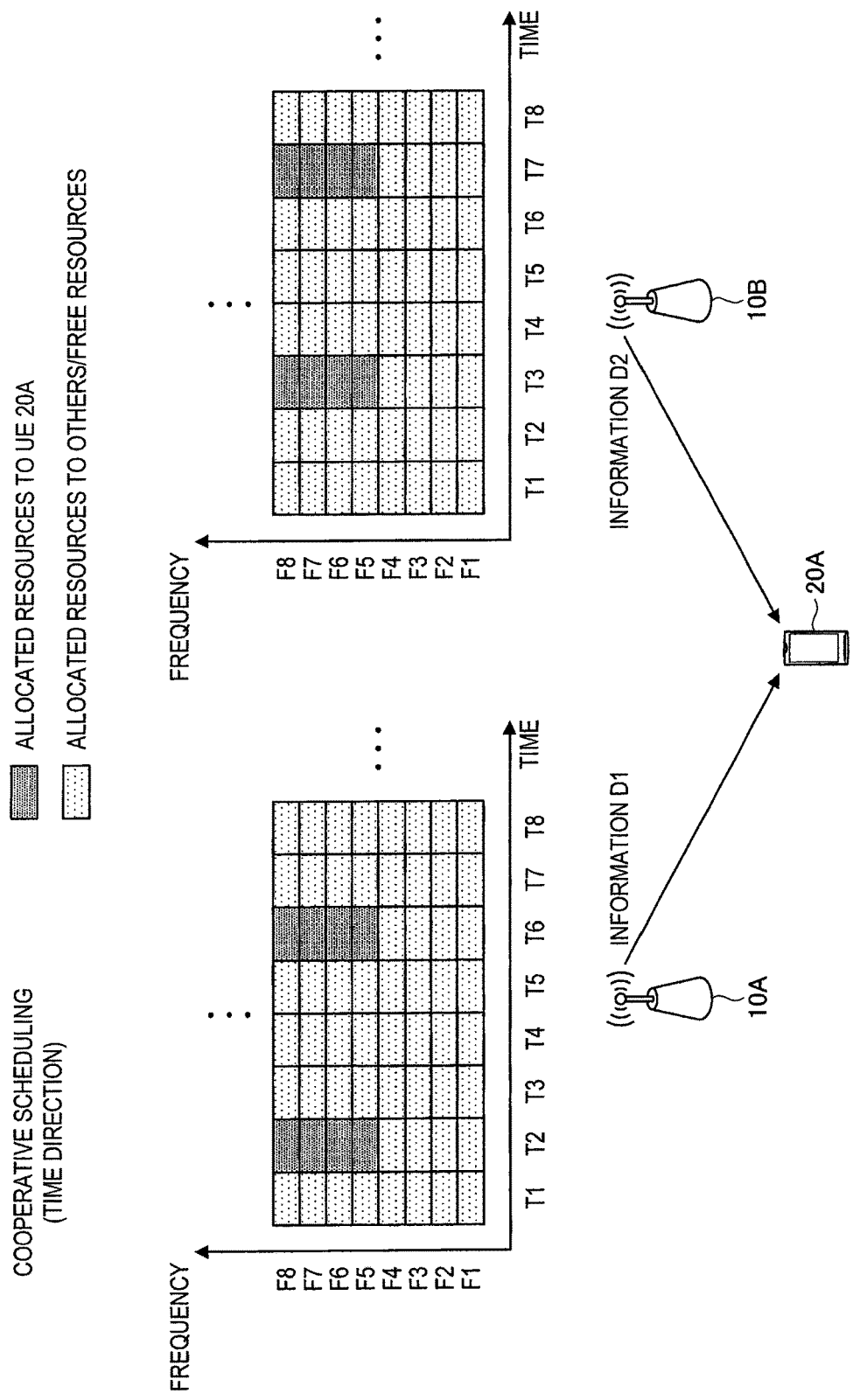
FIG. 10 is an explanatory view showing an example of cooperative scheduling in a time direction by two base stations.

FIG. 10 is an explanatory view showing an example of cooperative scheduling in a time direction by the two base stations 10. When cooperative scheduling in the time direction is performed, as shown in FIG. 10, the base stations 10A, 10B transmit different information using the same frequency resources, but different time resources. Also with the above configuration, signals from the base station 10A and the base station 10B are orthogonal in the UE 20A and thus, interference can be reduced.

FIGS. 9 and 10 show examples in which different information is transmitted from the base stations 10A, 10B, but the base stations 10A, 10B can obtain a diversity effect by transmitting the same information. FIGS. 9 and 10 shows transmission from a plurality of the base stations 10 to the UE 20, but cooperative scheduling for transmission from the UE 20 to the plurality of base stations 10 can also be realized by a similar method.

(Supplementary Remarks About CoMP)

As described above, cooperative control of communication resources used and sharing (distribution) of transmission information are needed for CoMP, but the main agent that realizes cooperative control and sharing of transmission information is not particularly limited. For example, the main agent may be the base station 10 (serving base station) to which the target UE 20 is connected or another apparatus like the management node 30 shown in FIG. 1.

<<2. First Embodiment>>

In the foregoing, the basic configuration of a wireless communication system according to the present disclosure has been described with reference to FIGS. 1 to 10. Subsequently, the first embodiment of the present disclosure will be described. As will be described in detail below, the base station 10 according to the first embodiment of the present disclosure performs communication of information about grouping of the UE 20 with surrounding base stations to be able to control CoMP communication based on the information about grouping.

<2-1. Configuration of Base Station>

Figure 11:
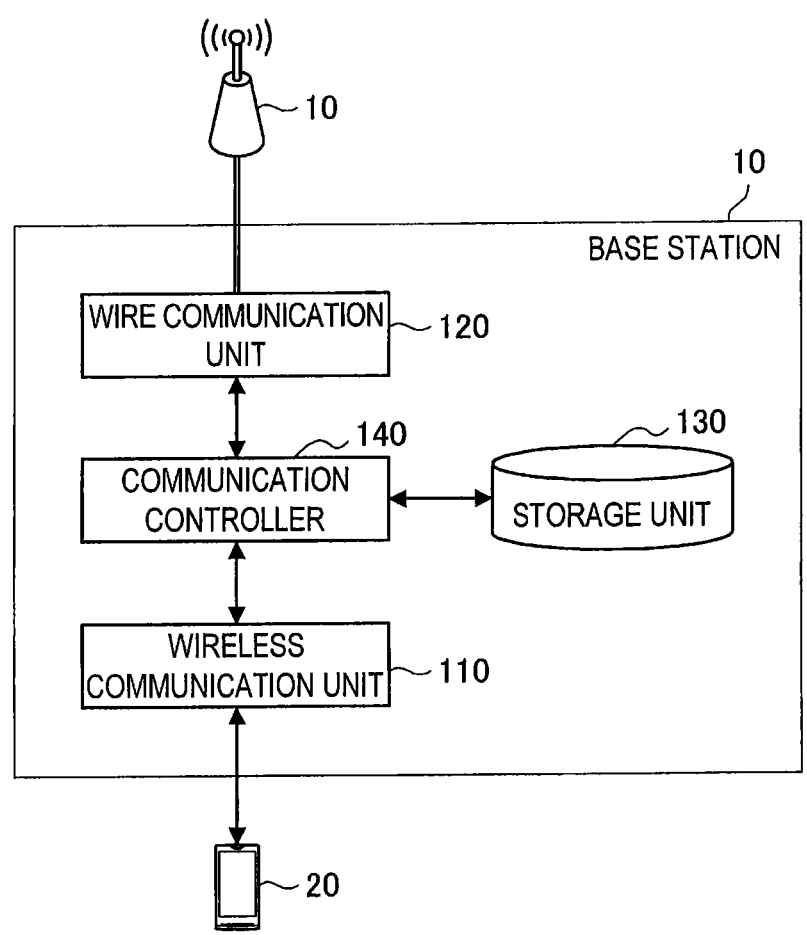
FIG. 11 is a functional block diagram showing the configuration of the base station according to a first embodiment.

FIG. 11 is a functional block diagram showing the configuration of the base station 10 according to the first embodiment. As shown in FIG. 11, the base station 10 according to the first embodiment includes a wireless communication unit 110, a wire communication unit 120, a storage unit 130, and a communication controller 140.

The wireless communication unit 110 functions as a transmitting unit to transmit a wireless signal to the UE 20 and as a receiving unit to receive a wireless signal from the UE 20. For example, the wireless communication unit 110 may be configured for reception and contain a plurality of antennas, an analog processing unit, an AD converter, a digital processing unit, and a decoder. The wireless communication unit 110 may be configured for transmission and contain an encoder, a digital processing unit, a DA converter, an analog processing unit, and a plurality of antennas.

The wire communication unit 120 functions as a transmitting unit to transmit information to the other base station 10, the management node 30 or the like and as a receiving unit to receive information from the other base station 10, the management node 30 or the like. The base station 10 according to the present embodiment can communicate, as will be described in detail in "2-2. Operation of Base Station", information about grouping and information to implement CoMP via the wire communication unit 120. FIG. 11 shows an example of wire interface to the other base station 10 or the management node 30, but the interface to the other base station 10 or the management node 30 may be wireless.

The storage unit 130 is a storage medium that stores programs to operate the base station 10 and various kinds of information. Particularly when the base station 10 groups the UE 20, a terminal list showing content of the grouping is stored in the storage unit 130.

The communication controller 140 controls overall communication of the base station 10 such as communication with the UE 20 by the wireless communication unit 110 and communication with the other base stations 10 by the wire communication unit 120. More specifically, the communication controller 140 controls communication of information about grouping with the other base station 10. The communication controller 140 also sets communication parameters to perform CoMP communication with the other base station 10. If terminal list is stored in the storage unit 130, the communication controller 140 determines whether to allow communication with the UE 20 in accordance with whether the target UE 20 is contained in the terminal list or gives priority to connection of the target UE 20.

<2-2. Operation of Base Station>

In the foregoing, the configuration of the base station 10 according to the present embodiment has been described with reference to FIG. 11. Subsequently, after providing an overview of the operation of the base station 10 according to the present embodiment with reference to FIG. 12, the operation of the base station 10 according to the present embodiment will be described in detail.

Figure 12:
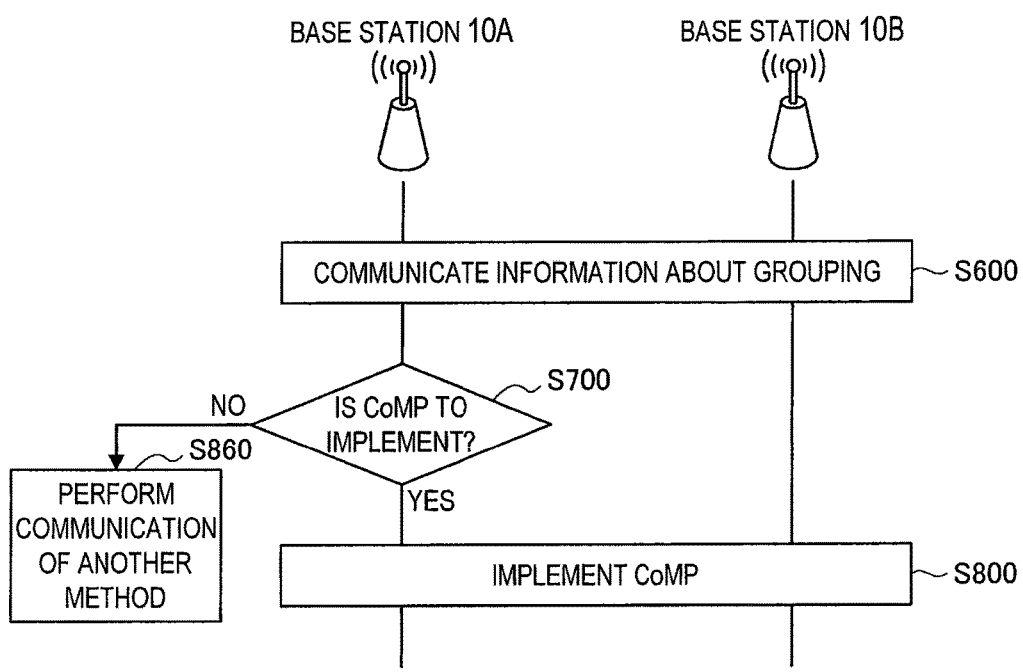
FIG. 12 is a sequence diagram showing an overview of operation of the base station according to the present embodiment.

FIG. 12 is a sequence diagram showing an overview of the operation of the base station 10 according to the present embodiment. As shown in FIG. 12, the base stations 10A, 10B transmit information about grouping of the UE 20 (S600). The information about grouping may be, as will be described in "Communication of information about grouping" in detail, information about whether or not the UE 20 is grouped or information whether a terminal list having the specific UE 20 is held.

Then, the base station 10A determines whether to implement CoMP with the base station 10B based on the information about grouping obtained in the communication in S600 (S700). Then, if the base station 10A determines to implement CoMP, the base station 10A proceeds to the procedure to implement CoMP with the base station 10B (S800). On the other hand, if the base station 10A determines not to implement CoMP, the base station 10A performs communication by a different method like one-to-one communication with the UE 20 (S860).

Therefore, according to the present embodiment, a combined effect of the introduction of grouping of the UE 20 and the introduction of CoMP can be obtained. Each operation by the base station 10 according to the present embodiment described above will be described in detail below. Two base stations (10A and 10B) are shown as an example of a plurality of base station in FIG. 12, but the present embodiment can also be applied to communication by the three base stations 10 or more.

—Communication of Information About Grouping—

Whether each of the base stations 10 groups the UE 20 is very important to judge whether to implement CoMP. Thus, as shown in S600 in FIG. 12, the base station 10 checks whether the surrounding base stations 10 group the UE 20. Hereinafter, a communication protocol of information about grouping between the base stations 10 will be described, but another apparatus may be interposed between the base stations 10. In such a case, the interposed apparatus plays the role of signaling or transferring ACK/NACK. When information about grouping is managed by an apparatus (for example, the management node 30) other than the base station 10, the communication protocol described below may be invoked as the communication protocol between the base station 10 and the management node 30.

(First Communication Example: FIGS. 13, 14)

FIGS. 13 and 14 are sequence diagrams showing a first communication example of information about grouping. In the first communication example, as shown in FIG. 13, the base station 10A notifies the base station 10B of having grouped the UE 20 (S602). In addition to having grouped the UE 20, the base station 10A may make a notification of a terminal list held by the base station 10A. When the notification is received from the base station 10A, the base station 10B transmits ACK to the base station 10A (S604).

On the other hand, if the base station 10B fails to receive the notification from the base station 10A, as shown in FIG. 14, the base station 10B transmits NACK to the base station 10A (S606). Alternatively, the base station 10B transmits neither ACK nor NACK to the base station 10A (no response). In this case, the base station 10A may notify the base station 10B of having grouped the UE 20 again (S608). In addition, a predetermined upper limit may be set to the number of times of notification. When the number of times of notification reaches the predetermined upper limit, retransmission of the notification may be stopped.

(Second Communication Example: FIGS. 15, 16)

FIGS. 15 and 16 are sequence diagrams showing a second communication example of information about grouping. In the second communication example, as shown in FIG. 15, the base station 10A makes an inquiry about whether the base station 10B groups the UE 20 at the base station 10B (S612). When the inquiry is received from the base station 10A, the base station 10B transmits information indicating whether the base station 10B groups the UE 20 to the base station 10A (S614).

On the other hand, when NACK is received from the base station 10B or no response is received from the base station 10B (S616), as shown in FIG. 16, the base station 10A may make an inquiry about whether the base station 10B groups the UE 20 at the base station 10B again (S618). In addition, a predetermined upper limit may be set to the number of times of inquiry. When the number of times of inquiry reaches the predetermined upper limit, retransmission of the inquiry may be stopped.

(Third Communication Example: FIGS. 17, 18)

FIGS. 17 and 18 are sequence diagrams showing a third communication example of information about grouping. In the third communication example, as shown in FIG. 17, the base station 10A makes an inquiry about the terminal list of the base station 10B at the base station 10B (S622). When the inquiry is received from the base station 10A, the base station 10B transmits the terminal list of the base station 10B to the base station 10A (S624).

On the other hand, when NACK is received from the base station 10B or no response is received from the base station 10B (S626), as shown in FIG. 18, the base station 10A may make an inquiry about the terminal list of the base station 10B at the base station 10B again (S628). In addition, a predetermined upper limit may be set to the number of times of inquiry. When the number of times of inquiry reaches the predetermined upper limit, retransmission of the inquiry may be stopped. After making sure that the base station 10B groups the UE 20 according to the second communication example, the base station 10A may exercise the control of the third communication example.

(Fourth Communication Example: FIGS. 19, 20)

FIGS. 19 and 20 are sequence diagrams showing a fourth communication example of information about grouping. In the fourth communication example, as shown in FIG. 19, the base station 10A makes an inquiry about whether target UE 20X is contained in the terminal list of the base station 10B at the base station 10B (S632). When the inquiry is received from the base station 10A, the base station 10B checks whether the UE 20X is contained in the terminal list of the base station 10B and transmits the check result to the base station 10A (S634).

On the other hand, when NACK is received from the base station 10B or no response is received from the base station 10B (S636), as shown in FIG. 20, the base station 10A may make an inquiry about whether target UE 20X is contained in the terminal list of the base station 10B at the base station 10B again (S638). In addition, a predetermined upper limit may be set to the number of times of inquiry. When the number of times of inquiry reaches the predetermined upper limit, retransmission of the inquiry may be stopped. After making sure that the base station 10B groups the UE 20 according to the second communication example, the base station 10A may exercise the control of the fourth communication example.

(Fifth Communication Example: FIGS. 21, 22)

FIGS. 21 and 22 are sequence diagrams showing a fifth communication example of information about grouping. In the fifth communication example, as shown in FIG. 21, the base station 10A makes an inquiry about whether to participate in CoMP concerning the target UE 20X (S642). When the inquiry is received from the base station 10A, the base station 10B judges whether CoMP can be performed for the UE 20X and transmits the result to the base station 10A (S644). If, for example, the base station 10B does not group the UE 20, the UE 20X is contained in the terminal list of the base station 10B, or the base station 10B is open to the UE 20X that is not contained in the terminal list, the base station 10B may determine that CoMP for the UE 20X is possible.

On the other hand, when NACK is received from the base station 10B or no response is received from the base station 10B (S646), as shown in FIG. 22, the base station 10A may make an inquiry about whether to participate in CoMP concerning the target UE 20X at the base station 10B again (S648). In addition, a predetermined upper limit may be set to the number of times of inquiry. When the number of times of inquiry reaches the predetermined upper limit, retransmission of the inquiry may be stopped. After making sure that the base station 10B groups the UE 20 according to the second communication example, the base station 10A may exercise the control of the fifth communication example. Further, after making sure that the base station 10B groups the UE 20 according to the third communication example or the fourth communication example, the base station 10A may exercise the control of the fifth communication example.

(Supplementary Remarks About Communication of Information About Grouping)

The communication protocol of information about grouping described above is desirably implemented particularly in the application layer. With the above configuration, any protocol can be selected in a lower layer of the channel actually connecting the base stations 10 or the management nodes 30 and therefore, the degree of freedom of the configuration of a communication system can be improved. Particularly when the above communication protocol is implemented in a cellular system like LTE (Long Term Evolution), the above communication protocol is desirably implemented as a portion of the X2 interface or the S1 interface. In this manner, the cost of newly implementing a protocol interface can be reduced.

—Judgment Whether to Implement CoMP—

As described above, after communicating information about grouping of the UE 20 with surrounding base stations, the base station 10 can judge whether to implement CoMP and if CoMP should be performed, in which way to implement CoMP. Concrete examples of such judgment will be described below. The judgment about CoMP may be made by the base station 10 (serving base station) to which the UE 20 intended for CoMP is mainly connected or by the other base station 10 or the management node 30.

(First Judgment Example: FIG. 23)

FIG. 23 is a flow chart showing a first judgment example about CoMP. As shown in FIG. 23, the communication controller 140 of the base station 10 first checks information about grouping received from surrounding base stations (S702). Then, if the base station 10 does not group the UE 20 (S704) and a surrounding base station groups the UE 20 (S706), the communication controller 140 controls one-to-one communication with the target UE 20 (S708).

On the other hand, if the base station 10 groups the UE 20 (S704) or no surrounding base station groups the UE 20 (S706), the communication controller 140 controls communication with the UE 20 by any method like CoMP (S710).

According to the first judgment, if at least one base station that groups the UE 20 is present in the surrounding, the base station 10 performs normal one-to-one communication with the target UE. Accordingly, simple communication with the UE 20 can be realized by suppressing signaling to implement CoMP.

(Second Judgment Example: FIG. 24)

FIG. 24 is a flow chart showing a second judgment example about CoMP. As shown in FIG. 24, the communication controller 140 of the base station 10 first checks information about grouping received from surrounding base stations (S712). Then, if the base station 10 groups the UE 20 (S714), the communication controller 140 controls communication with the UE 20 by any method like one-to-one communication, broadcast communication, or CoMP communication (S716).

On the other hand, if the base station 10 does not group the UE 20 (S714), the communication controller 140 repeats the processing in S718 to S724 for each surrounding base station. More specifically, if a surrounding base station groups the UE 20 (S718), the target UE 20 is not contained in the terminal list of the surrounding base station (S720), and the surrounding base station is not open to the UE 20 that is not contained in the terminal list (S722), the communication controller 140 excludes the surrounding base station from partners of CoMP (S724).

Then, the communication controller 140 controls communication to request cooperation of CoMP with surrounding base stations that are not excluded from partners of CoMP (S726).

(Third Judgment Example: FIG. 25)

FIG. 25 is a flow chart showing a third judgment example about CoMP. As shown in FIG. 25, the communication controller 140 of the base station 10 first checks information about grouping received from surrounding base stations (S732). Then, if the base station 10 groups the UE 20 (S734), the communication controller 140 controls one-to-one communication with the UE 20 (S736). On the other hand, if the base station 10 does not group the UE 20 (S734), the communication controller 140 controls communication with the UE 20 by any method like one-to-one communication, broadcast communication, or CoMP communication (S738).

According to the third judgment example, if the base station 10 is a CSG cell like, for example, a femto cell base station, the base station 10 judges not to implement CoMP. In this case, signaling to implement CoMP can be reduced. When operating according to the third judgment example, the base station 10 may not have the step (S600) of performing communication about grouping with surrounding base stations as described with reference to FIGS. 12 to 22.

(Fourth Judgment Example: FIG. 26)

FIG. 26 is a flow chart showing a fourth judgment example about CoMP. As shown in FIG. 26, the communication controller 140 of the base station 10 first checks information about grouping received from surrounding base stations (S742). Then, if the base station 10 does not group the UE 20 (S744), the communication controller 140 controls communication with the UE 20 by any method like one-to-one communication or CoMP communication (S746).

On the other hand, if the base station 10 groups the UE 20 (S744), the communication controller 140 repeats the processing in S748 to S754 for each surrounding base station. More specifically, if a surrounding base station groups the UE 20 (S748), the target UE 20 is not contained in the terminal list of the surrounding base station (S750), and the surrounding base station is not open to the UE 20 that is not contained in the terminal list (S752), the communication controller 140 excludes the surrounding base station from partners of CoMP (S754).

Then, the communication controller 140 controls communication to request cooperation of CoMP with surrounding base stations that are not excluded from partners of CoMP (S756).

(Supplementary Remarks About Judgment Whether to Implement CoMP)

To sum up judgment examples described above, the base station 10 operates as described below. For convenience of description, a base station that does not group the UE 20 is called an OSG cell and a base station that groups the UE 20 is called a CSG cell.

A. When the serving base station is an OSG cell
A-1. When a CSG cell is present in the surrounding
A-1-1. When an OSG cell is present in the surrounding
(Operation example 1) CoMP with the surrounding base station including the CSG cell
(Operation example 2) CoMP with the base station excluding the CSG cell in the surrounding
(Operation example 3) CoMP is not performed
A-1-2. When an OSG cell is not present in the surrounding
(Operation example 1) CoMP with the CSG cell
(Operation example 2) CoMP is not performed
A-2. When a CSG cell is not present in the surrounding
A-2-1. When an OSG cell is present in the surrounding
(Operation example) CoMP with the OSG cell
A-2-2. When an OSG cell is not present in the surrounding
(Operation example) CoMP is not performed
B. When the serving base station is a CSG cell
B-1. When a CSG cell is present in the surrounding
B-1-1. When an OSG cell is present in the surrounding
(Operation example 1) CoMP with the surrounding base station including the OSG cell
(Operation example 2) CoMP with the base station excluding the OSG cell in the surrounding
(Operation example 3) CoMP is not performed
B-1-2. When an OSG cell is not present in the surrounding
(Operation example 1) CoMP with the base station excluding the OSG cell in the surrounding
(Operation example 2) CoMP is not performed
B-2. When a CSG cell is not present in the surrounding
B-2-1. When an OSG cell is present in the surrounding
(Operation example 1) CoMP with the surrounding base station including the OSG cell
(Operation example 2) CoMP is not performed
B-2-2. When an OSG cell is not present in the surrounding
(Operation example) CoMP is not performed
—Procedure for Performing CoMP—
When a judgment to implement CoMP is made by the above method, the base station 10 performs signaling to implement CoMP. A concrete example will be described below with reference to FIGS. 27 and 28.

Figure 27:
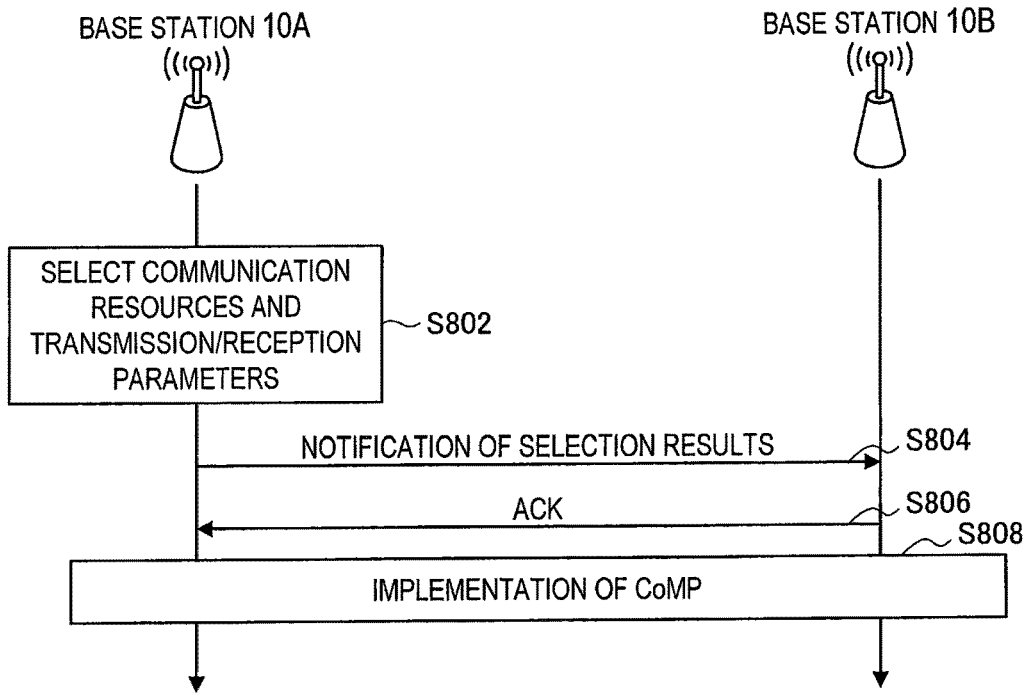
FIG. 27 is a sequence diagram showing signaling to implement CoMP.
Figure 28:
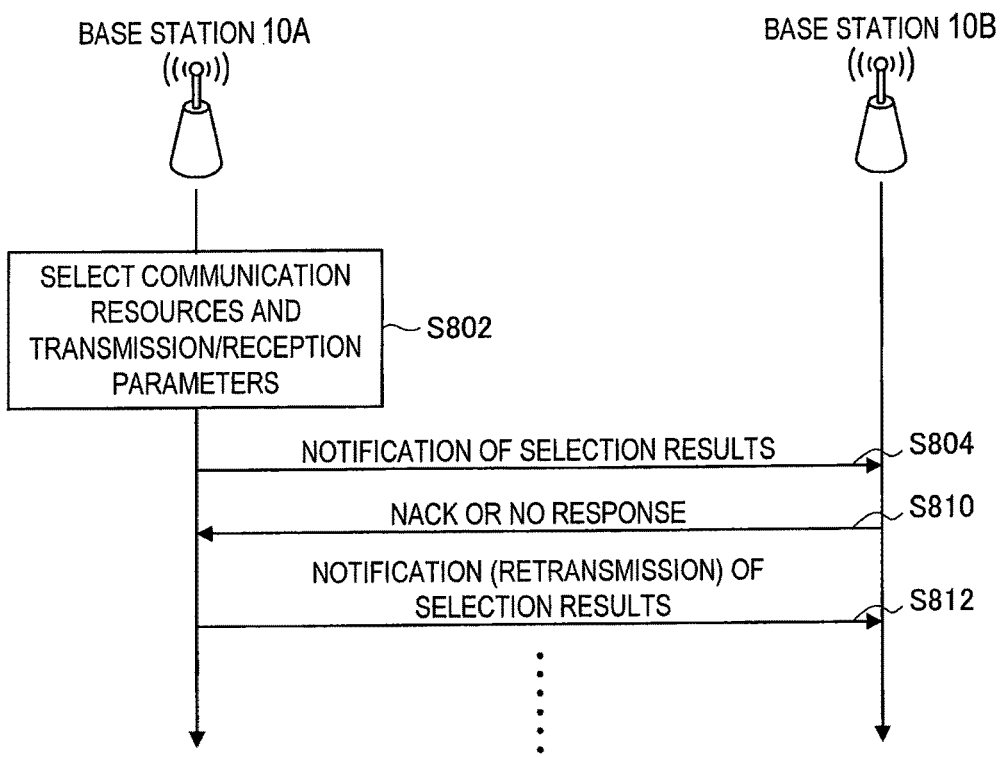
FIG. 28 is a sequence diagram showing signaling to implement CoMP.

FIGS. 27 and 28 are sequence diagrams showing signaling to implement CoMP. When, as shown in FIG. 27, information indicating participation in CoMP is received from the base station 10B, the base station 10A selects or calculates communication resource to implement CoMP and transmission/reception parameters such as the spatial weight, modulation method, and coding method (S802). Then, the base station 10A notifies the base station 10B of selection results such as transmission/reception parameters (S804). Subsequently, when ACK is received from the base station 10B (S806), the base station 10A implements CoMP according to communication resources and transmission/reception parameters selected in S802 (S808). A concrete example of CoMP is as shown in "1-2. CoMP".

On the other hand, when NACK is received from the base station 10B or no response is received from the base station 10B (S810), as shown in FIG. 28, the base station 10A notifies the base station 10B of selection results such as transmission/reception parameters (S812). In addition, a predetermined upper limit may be set to the number of times of notification. When NACK is received from the base station 10B or no response is received from the base station 10B (S810), or the number of times of notification reaches the predetermined number of times, the base station 10A may perform one-to-one communication with the UE 20 without implementing CoMP or implement CoMP with surrounding base stations.

Each of the base stations 10 may perform the following processing when implementing CoMP.

(a)

The serving base station 10 notifies the other base stations 10 that implement CoMP of the terminal ID of the target UE 20 and information to be transmitted. Each of the base stations 10 having received the notification transmits the notified information to the UE 20 having the notified terminal ID.

(b)

The serving base station 10 notifies the other base stations 10 that implement CoMP of the terminal ID of the target UE 20 and scheduling information. Each of the base stations 10 having received the notification allocates communication resources (the slot and resource block) indicated by the notified scheduling information for the UE 20 having the notified terminal ID.

(c)

The serving base station 10 notifies the other base stations 10 that implement CoMP of the terminal ID of the target UE 20 and scheduling information. Each of the base stations 10 having received the notification allocates different communication resources from communication resources indicated by the notified scheduling information for the UE 20 having the notified terminal ID.

(d)

A plurality of the base stations 10 that implement CoMP changes at least one parameter of transmission power, antenna directivity, and antenna weights from parameters during past transmission when transmitting a signal to the UE 20. These parameters may be decided by each of the base stations 10. In such a case, each of the base stations 10 may use past reception results of signals transmitted from the UE 20 to set these parameters. These parameters may also be decided by the serving base station 10 or the UE 20.

(e)

At least a portion of the plurality of base stations 10 that implement CoMP other than the serving base station 10 decodes and demodulates a signal when the signal is received from the target UE 20 and transmits the result to the serving base station 10.

(f)

At least a portion of the plurality of base stations 10 that implement CoMP other than the serving base station 10 does not transmit ACK/NACK from the UE 20 to the serving base station 10. Further, the plurality of base stations 10 that implement CoMP does not have to decode and demodulate ACK/NACK and does not have to schedule ACK/NACK.

(g)

At least a portion of the plurality of base stations 10 that implement CoMP does not transmit ACK/NACK to data received from the UE 20.

(h)

At least a portion of the plurality of base stations 10 that implement CoMP transmits a signal to the target UE 20 or receives a signal from the UE 20 using the same frequency band or frequency bands having an overlapping portion.

According to the first embodiment of the present disclosure, as described above, CoMP communication can appropriately be controlled even in a network in which the base station 10 that group the UE 20 like CSG cells and OSG cells and the base station 10 that does not group the UE 20 are mixed. That is, advantages due to the introduction of the base station 10 that groups the UE 20 and the introduction of CoMP communication can be obtained at the same time.

<<3. Second Embodiment>>

Subsequently, the second embodiment of the present disclosure will be described. In the second embodiment of the present disclosure, a mechanism to allow a plurality of base stations 10' to share the same terminal list will be proposed.

<3-1. Use Case of Second Embodiment>

In the second embodiment, a use case in which the plurality of base stations 10' having the same terminal list constitutes a communication system is assumed. For example, in a relatively large office, a use case in which the whole office is covered by the plurality of base stations 10' (small base stations like femto cell base stations) can be considered.

Figure 29:
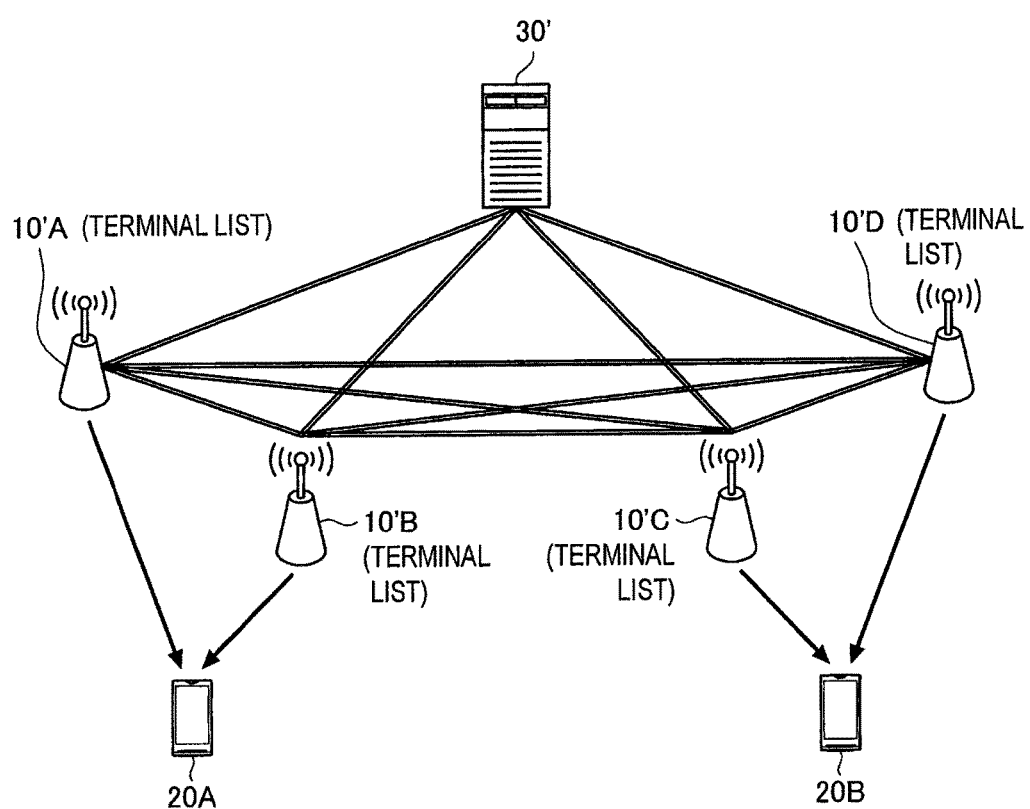
FIG. 29 is an explanatory view showing a use case according to a second embodiment.

In the example shown in FIG. 29, base stations 10'A to 10'D are arranged in the same office and the base stations 10'A to 10'D have the same terminal list. Accordingly, the UE 20 contained in the terminal list can connect to any of the base stations 10' from anywhere in the office. Incidentally, the terminal list may be managed by a management node 30'. In addition, the base station 10' can perform one-to-one communication with the UE 20 or, as described in the first embodiment, implement CoMP.

In such a communication system, it is important that the same terminal list is shared by each of the base stations 10'. Thus, the configuration to allow each of the base stations 10' to share the same terminal list will be described in detail.

<3-2. Configuration and Operation of Base Station>

Figure 30:
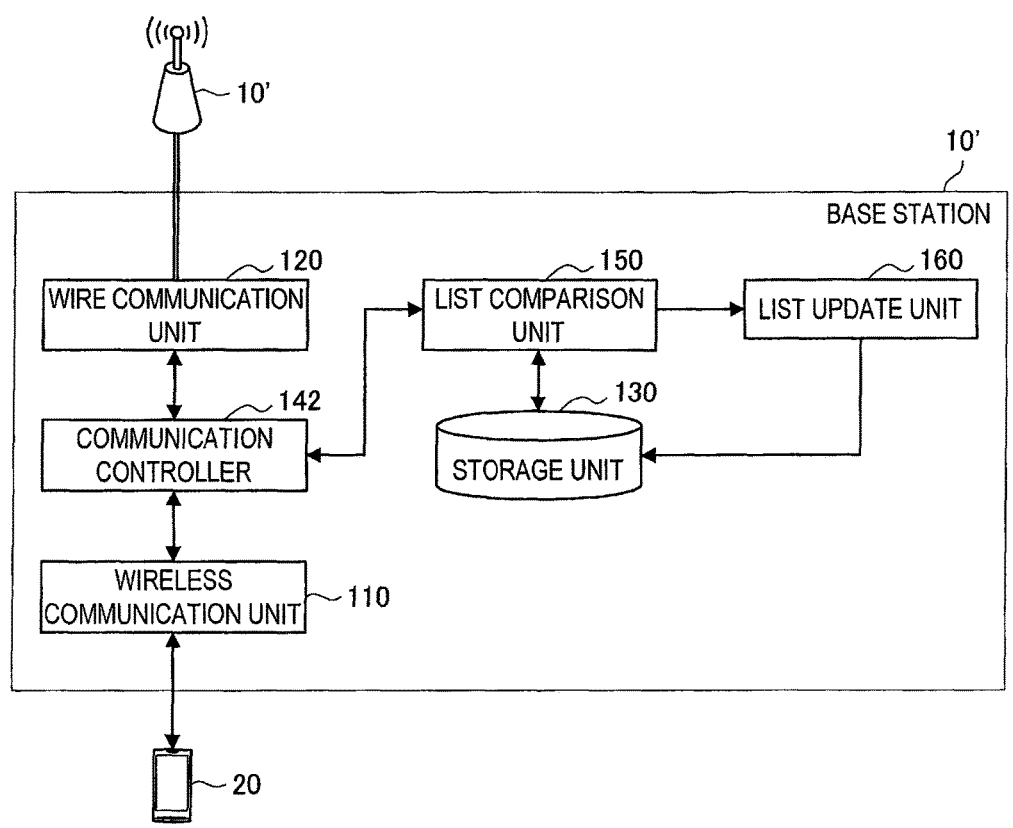
FIG. 30 is a functional block diagram showing the configuration of the base station according to the second embodiment.

FIG. 30 is a functional block diagram showing the configuration of the base station 10' according to the second embodiment. As shown in FIG. 30, the base station 10' according to the second embodiment include the wireless communication unit 110, the wire communication unit 120, the storage unit 130, a communication controller 142, a list comparison unit 150, and a list update unit 160. The wireless communication unit 110, the wire communication unit 120, and the storage unit 130 are as described in the first embodiment and thus, a detailed description thereof is here omitted.

The communication controller 142 controls, in addition to the function of the communication controller 140 described in the first embodiment, communication to acquire the terminal lists of the surrounding base stations 10'. The communication controller 142 also controls communication to request an update of the terminal lists of the surrounding base stations 10'.

The list comparison unit 150 compares the terminal lists of the surrounding base stations 10' and the terminal list of the base station 10' stored in the storage unit 130 to determine whether there is the surrounding base station 10' whose terminal list is different from the terminal list of the base station 10'.

When the list comparison unit 150 determines that there is the surrounding base station 10' whose terminal list is different from the terminal list of the base station 10', for example, the list update unit 160 matches the terminal list of the base station 10' stored in the storage unit 130 to the terminal list of the surrounding base station 10'.

Also when the list comparison unit 150 determines that there is the surrounding base station 10' whose terminal list is different from the terminal list of the base station 10', the communication controller 142 may control communication that requests matching of the terminal list of the surrounding base stations 10' to the terminal list of the base station 10' stored in the storage unit 130.

Hereinafter, operation examples of the base station 10' will concretely be described with reference to FIGS. 31 to 34.

(First Operation Example)

Figure 31:
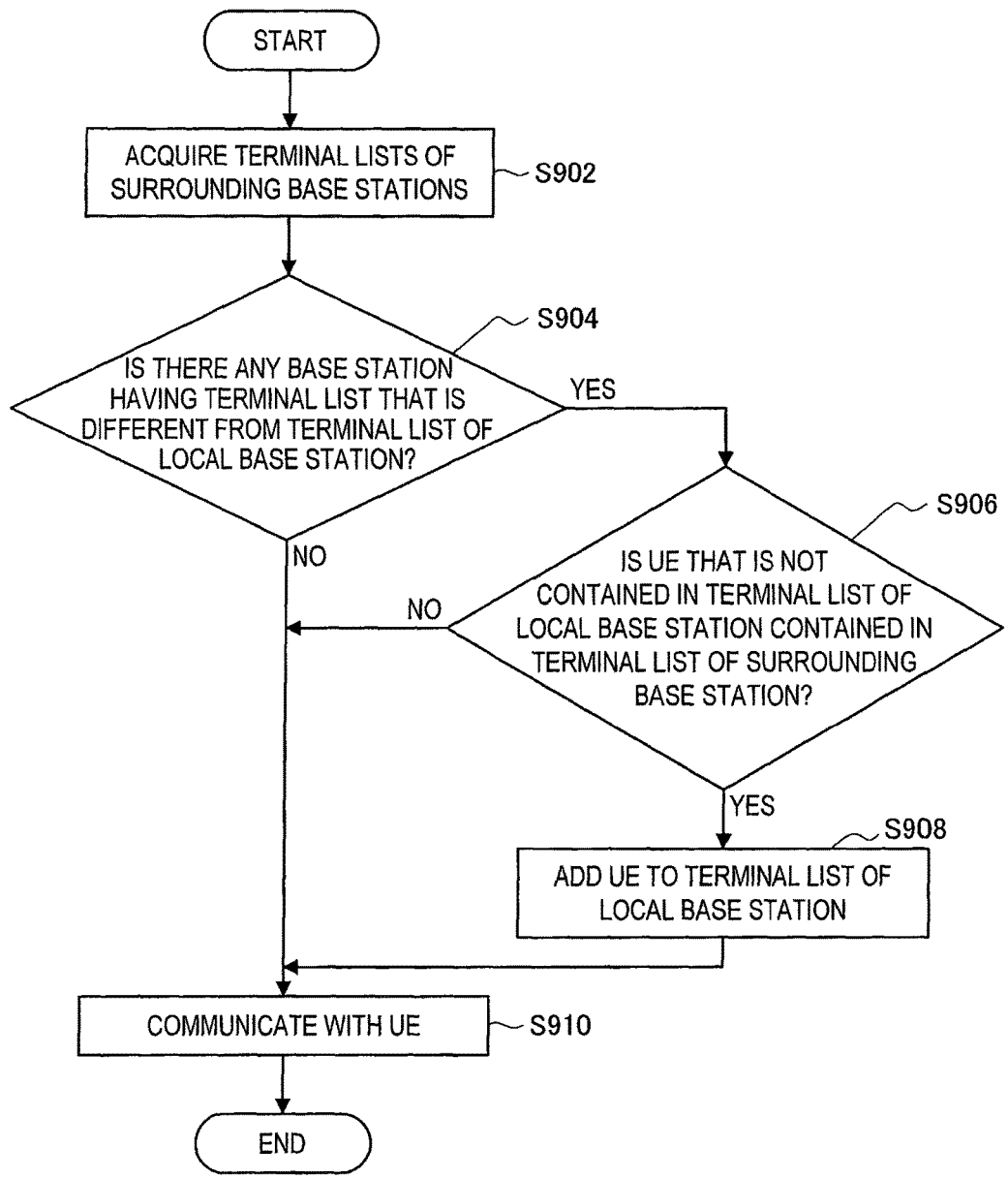
FIG. 31 is a flow chart showing a first operation example of the base station according to the second embodiment.

FIG. 31 is a flow chart showing a first operation example of the base station 10' according to the second embodiment. As shown in FIG. 31, first when the base station 10' acquires the terminal lists of the surrounding base stations 10' according to the control of the communication controller 142 (S902), the list comparison unit 150 determines whether there is the surrounding base station 10' whose terminal list is different from the terminal list of the base station 10' stored in the storage unit 130 (S904).

Then, if there is the surrounding base station 10' having a different terminal list from the terminal list of the base station 10' and the UE 20 that is not contained in the terminal list of the base station 10' is contained in the terminal list of the surrounding base station 10', the list update unit 160 adds the applicable UE 20 to the terminal list of the base station 10' (S908). Then, the base station 10' proceeds to the step of communication with the UE 20 (S910).

(Second Operation Example)

Figure 32:
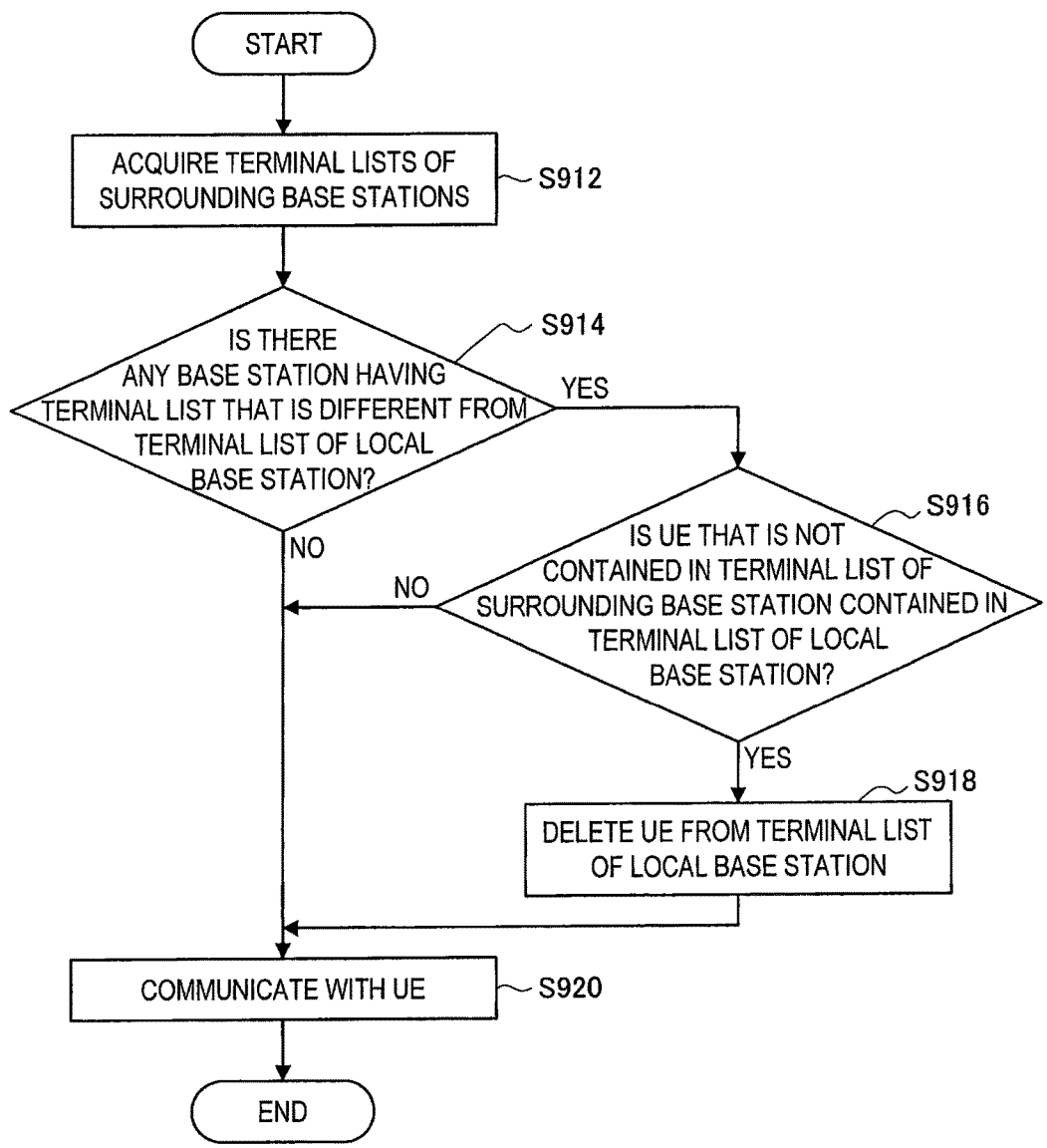
FIG. 32 is a flow chart showing a second operation example of the base station according to the second embodiment.

FIG. 32 is a flow chart showing a second operation example of the base station 10' according to the second embodiment. As shown in FIG. 32, first when the base station 10' acquires the terminal lists of the surrounding base stations 10' according to the control of the communication control 142 (S912), the list comparison unit 150 determines whether there is the surrounding base station 10' whose terminal list is different from the terminal list of the base station 10' stored in the storage unit 130 (S914).

Then, if there is the surrounding base station 10' having a different terminal list from the terminal list of the base station 10' and the UE 20 that is not contained in the terminal list of the surrounding base station 10' is contained in the terminal list of the base station 10' (S916), the list update unit 160 deletes the applicable UE 20 from the terminal list of the base station 10' (S918). Then, the base station 10' proceeds to the step of communication with the UE 20 (S920).

The terminal lists of the base station 10' and the surrounding base station 10' can be matched by the first operation example and the second operation example described above. Examples in which the terminal list of the base station 10' is updated are described above, but like a third operation example and a fourth operation example described below, the terminal lists of the base station 10' and the surrounding base station 10' can also be matched by updating the terminal list of the surrounding base station 10'.

(Third Operation Example)

Figure 33:
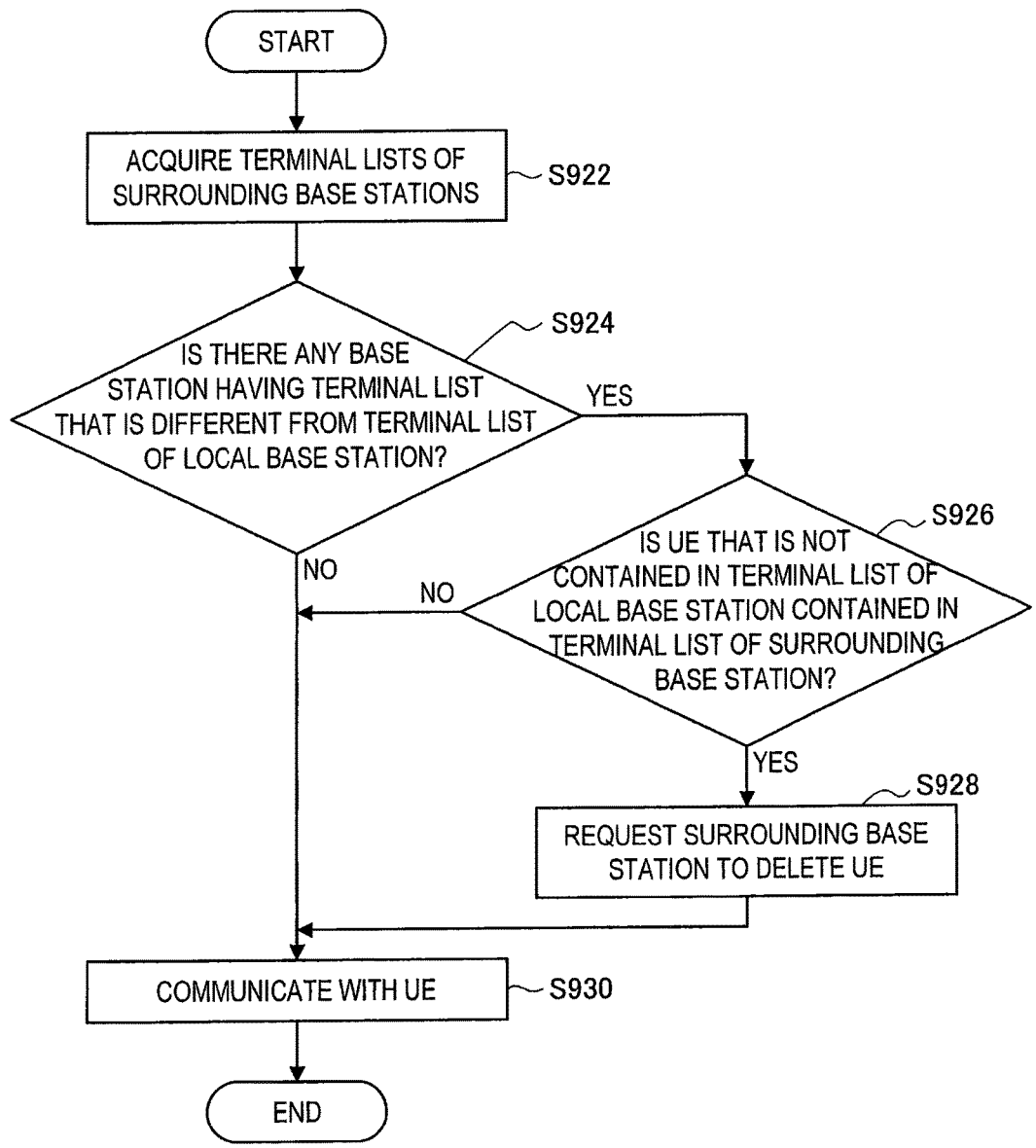
FIG. 33 is a flow chart showing a third operation example of the base station according to the second embodiment.

FIG. 33 is a flow chart showing a third operation example of the base station 10' according to the second embodiment. As shown in FIG. 33, first when the base station 10' acquires the terminal lists of the surrounding base stations 10' according to the control of the communication control 142 (S922), the list comparison unit 150 determines whether there is the surrounding base station 10' whose terminal list is different from the terminal list of the base station 10' stored in the storage unit 130 (S924).

Then, if there is the surrounding base station 10' having a different terminal list from the terminal list of the base station 10' and the UE 20 that is not contained in the terminal list of the base station 10' is contained in the terminal list of the surrounding base station 10' (S926), the communication controller 142 controls communication that requests deletion of the applicable UE 20 from the surrounding base station 10' (S928). Then, the base station 10' proceeds to the step of communication with the UE 20 (S930).

(Fourth Operation Example)

Figure 34:
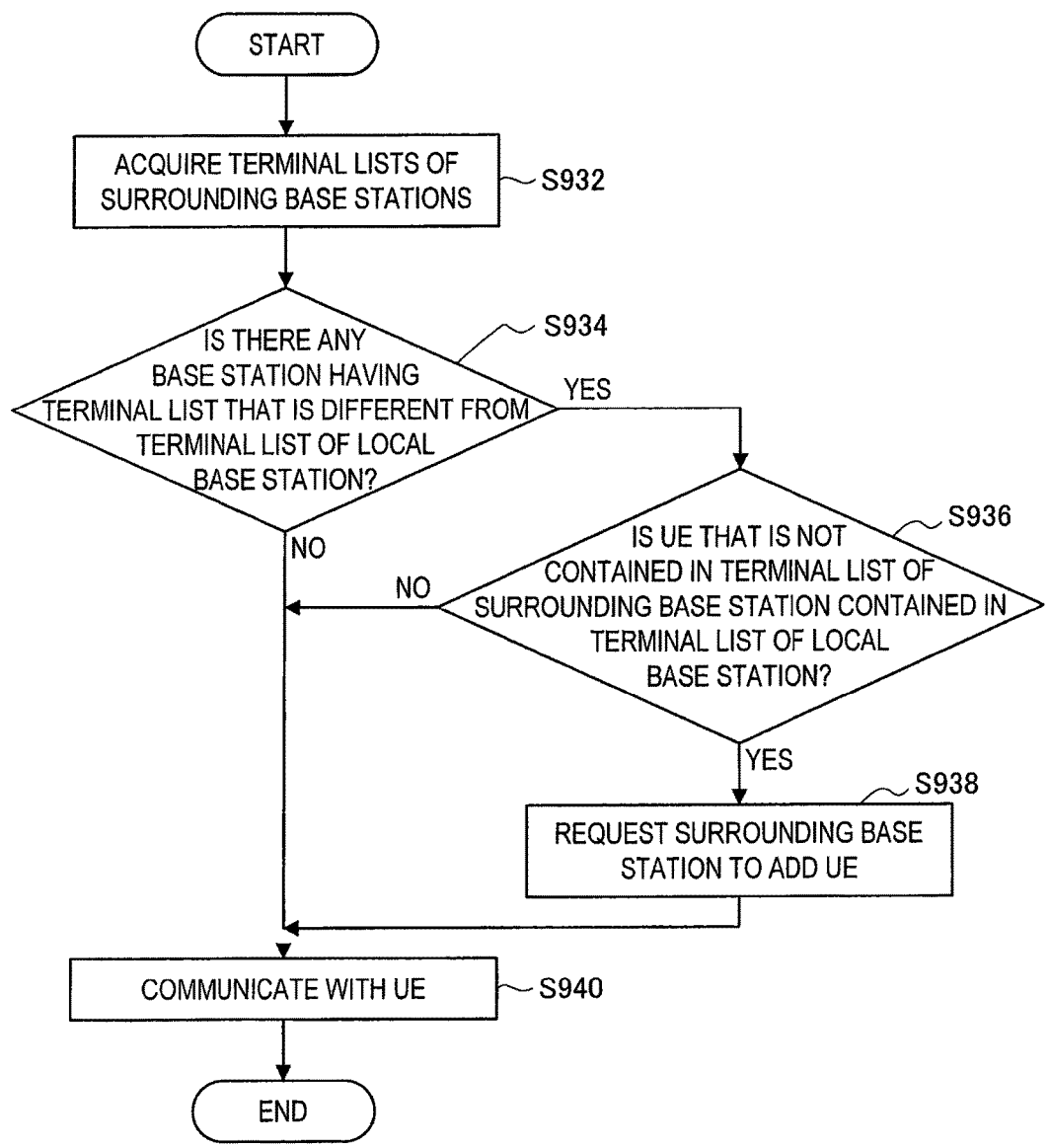
FIG. 34 is a flow chart showing a fourth operation example of the base station according to the second embodiment.

FIG. 34 is a flow chart showing a fourth operation example of the base station 10' according to the second embodiment. As shown in FIG. 34, first when the base station 10' acquires the terminal lists of the surrounding base stations 10' according to the control of the communication controller 142 (S932), the list comparison unit 150 determines whether there is the surrounding base station 10' whose terminal list is different from the terminal list of the base station 10' stored in the storage unit 130 (S934).

Then, if there is the surrounding base station 10' having a different terminal list from the terminal list of the base station 10' and the UE 20 that is not contained in the terminal list of the surrounding base station 10' is contained in the terminal list of the base station 10' (S936), the communication controller 142 controls communication that requests addition of the applicable UE 20 from the surrounding base station 10' (S938). Then, the base station 10' proceeds to the step of communication with the UE 20 (S940).

<3-3. Configuration and Operation of Management Node>

Examples of matching the terminal lists of the plurality of base station 10' by the base station 10' acting as a main agent are described above, but the management node 30' may also act as a main agent to match the terminal lists of the plurality of base station 10'. The configuration and operation of the above management node 30' will be described in detail below.

Figure 35:
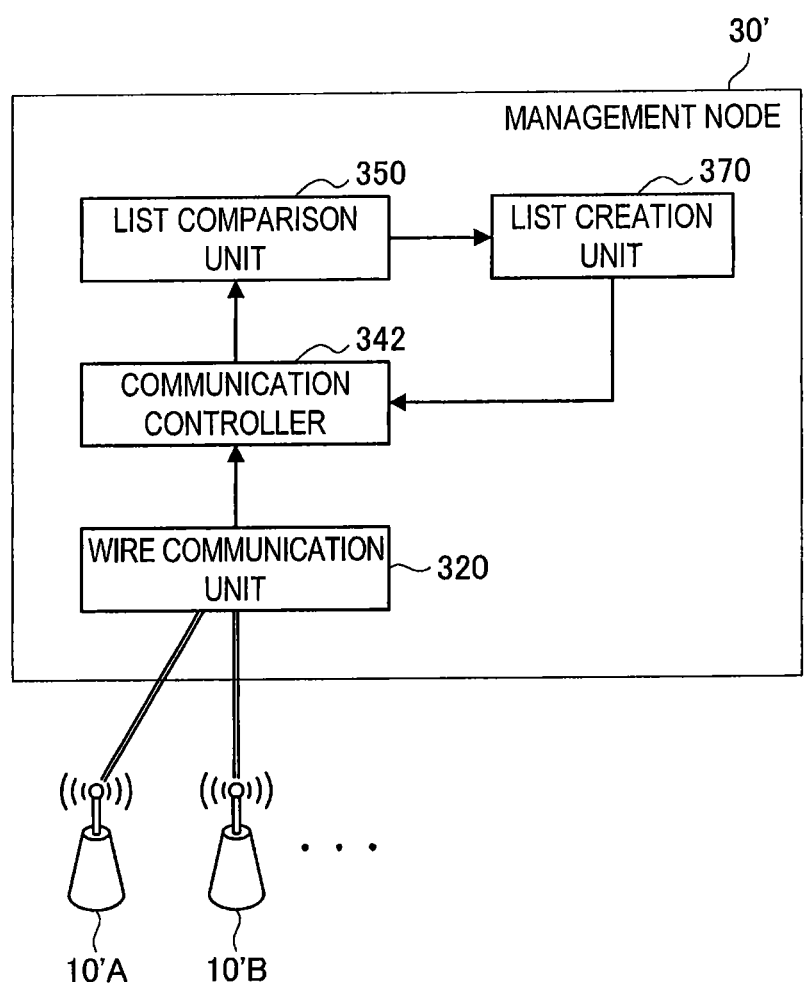
FIG. 35 is a functional block diagram showing the configuration of a management node.

FIG. 35 is a functional block diagram showing the configuration of the management node 30'. As shown in FIG. 35, the management node 30' includes a wire communication unit 320, a communication controller 342, a list comparison unit 350, and a list creation unit 370.

The wire communication unit 320 functions as a transmitting unit to transmit information to the base station 10' and as a receiving unit to receive information from the base station 10'. For example, the wire communication unit 320 receives the terminal list from each of the base stations 10' and transmits the terminal list created by the list creation unit 370 to each of the base stations 10'. FIG. 35 shows an example in which a wire interface is formed between the management node 30' and the base station 10', but a wireless interface may be formed between the management node 30' and the base station 10'.

The communication controller 342 controls the overall communication by the wire communication unit 320. For example, the communication controller 342 controls communication to request the terminal list from each of the base stations 10' or transmission of the terminal list created by the list creation unit 370 to each of the base stations 10'.

The list comparison unit 350 compares the terminal lists received by the wire communication unit 320 from the base stations 10' to determine whether, among the terminal lists of the base stations 10', there is a terminal list that is different from others.

If it is determined that, among the terminal lists of the base stations 10', there is a terminal list that is different from others, the list creation unit 370 creates a new list based on the terminal list of each of the base stations 10'. The new terminal list created by the list creation unit 370 is transmitted to each of the base stations 10' from the wire communication unit 230.

An operation example of the management node 30' will be described more concretely below with reference to FIGS. 36 and 37.

Figure 36:
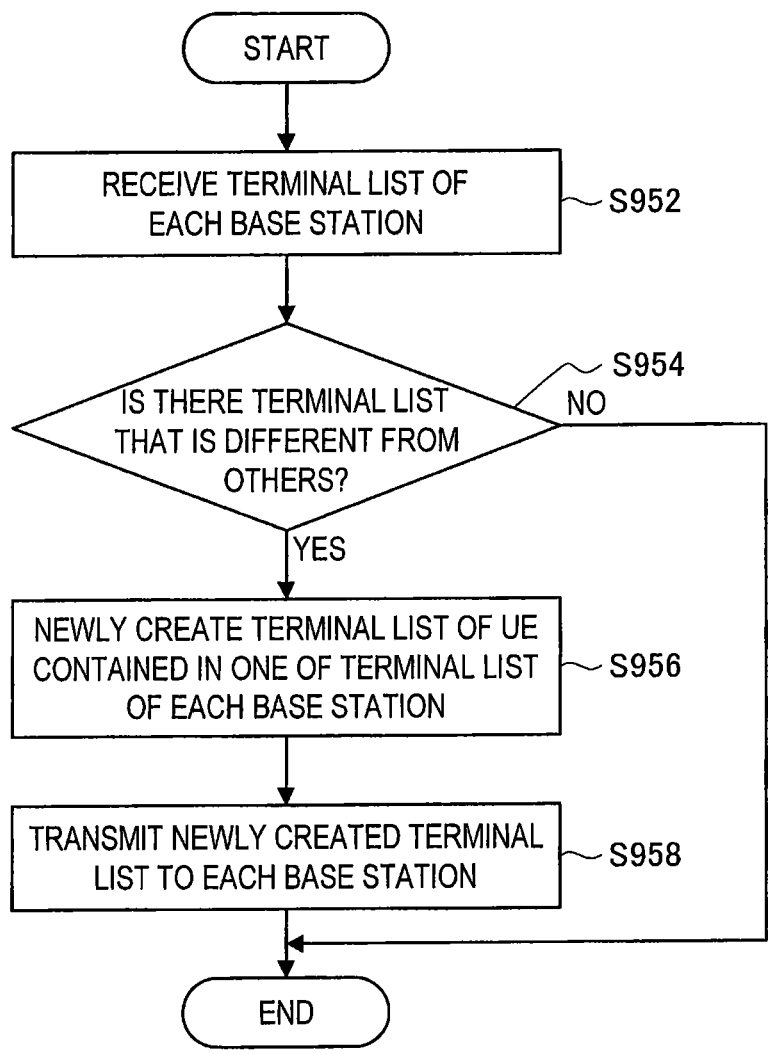
FIG. 36 is a flow chart showing a first operation example of the management node.

FIG. 36 is a flow chart showing a first operation example of the management node 30'. As shown in FIG. 36, when the management node 30' receives the terminal list from each of the base stations 10' under the control of the communication controller 342 (S952), the list comparison unit 350 determines whether, among the terminal lists of the base stations 10', there is a terminal list that is different from others (S954).

Subsequently, if there is a terminal list that is different from others, the list creation unit 370 newly creates a terminal list containing the UE 20 included in one of these terminal lists of the base stations 10' (S956). If, for example, the terminal list of the base station 10'A contains the UE 20A, UE 20B, UE 20D and the terminal list of the base station 10'B contains the UE 20A, UE 20B, UE 20C, the list creation unit 370 creates a terminal list containing the UE 20A, UE 20B, UE 20C. UE 20D. Then, the wire communication unit 320 transmits the new terminal list created by the list creation unit 370 to each of the base stations 10' (S958).

Figure 37:
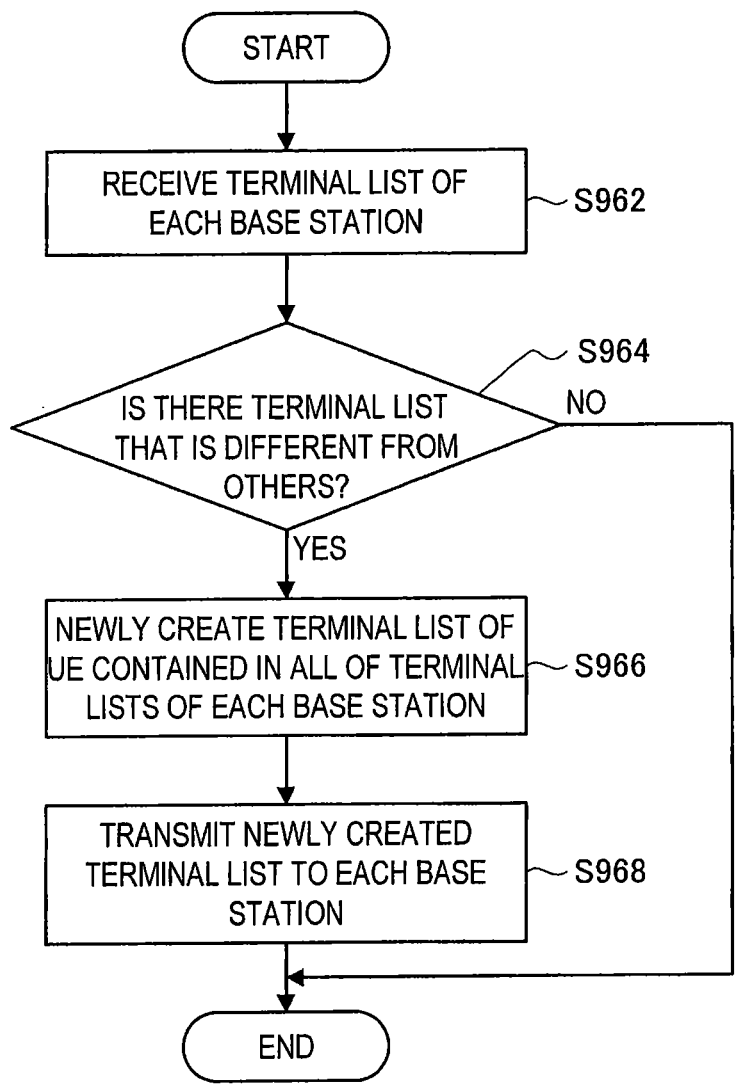
FIG. 37 is a flow chart showing a second operation example of the management node.

FIG. 37 is a flow chart showing a second operation example of the management node 30'. As shown in FIG. 37, when the management node 30' receives the terminal list from each of the base stations 10' under the control of the communication controller 342 (S962), the list comparison unit 350 determines whether, among the terminal lists of the base stations 10', there is a terminal list that is different from others (S964).

Subsequently, if there is a terminal list that is different from others, the list creation unit 370 newly creates a terminal list containing the UE 20 included in all terminal lists of the base stations 10' (S966). If, for example, the terminal list of the base station 10'A contains the UE 20A, UE 20B, UE 20D and the terminal list of the base station 10'B contains the UE 20A, UE 20B, UE 20C, the list creation unit 370 creates a terminal list containing the UE 20A, UE 20B. Then, the wire communication unit 320 transmits the new terminal list created by the list creation unit 370 to each of the base stations 10' (S968).

In the second operation example, the UE 20 excluding the UE 20 permitted to access all the base stations 10' is excluded and thus, from the viewpoint of security, the example is robust with respect to access from the UE 20.

<3-4. Supplementary Remarks>

In the foregoing, examples of updating the terminal list by the base station 10' or the management node 30' as a main agent have been described. The terminal list may periodically be updated by the base station 10' or the management node 30', but as will be described below, the base station 10' or the management node 30' may update the terminal list in accordance with a request from the UE 20.

Figure 38:
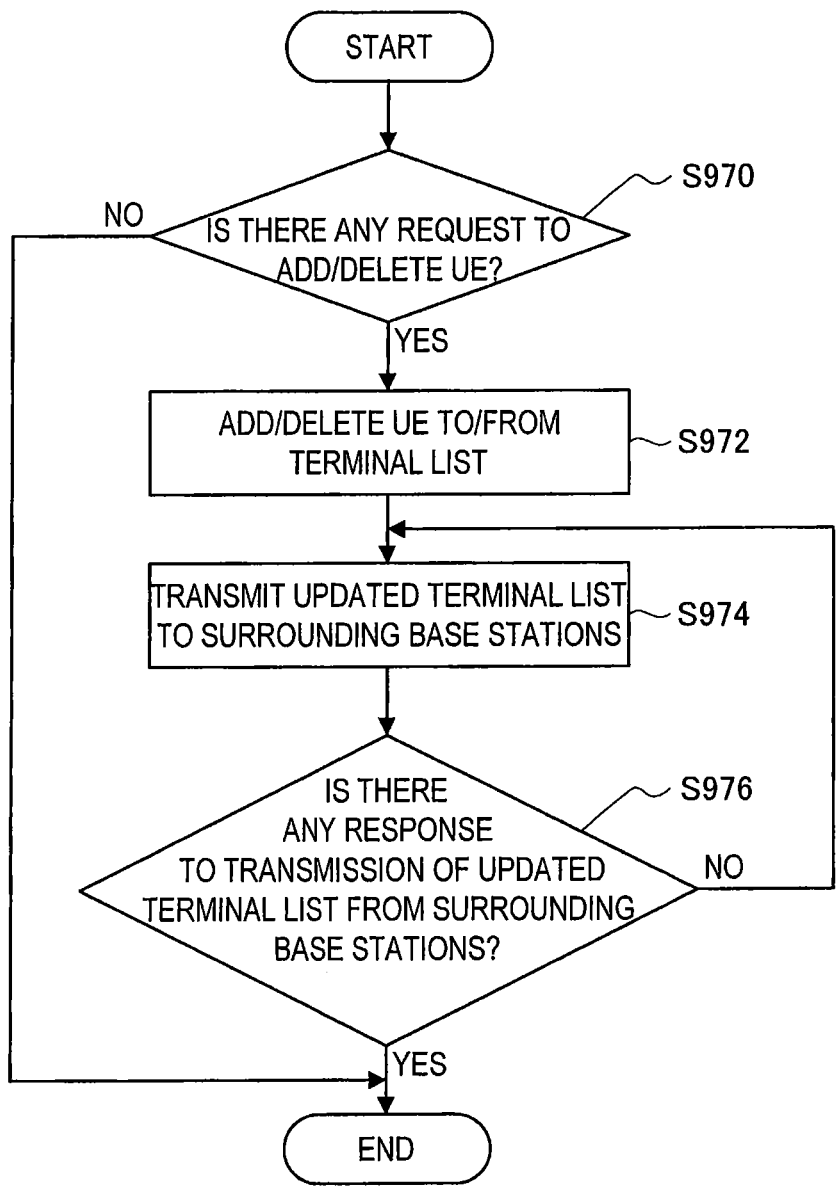
FIG. 38 is a flow chart showing update processing of a terminal list by the base station.

FIG. 38 is a flow chart showing update processing of the terminal list by the base station 10'. As shown in FIG. 38, when a request of addition/deletion of the UE 20 to/from the terminal list is received from the UE 20 (S970), the wireless communication unit 110 of the base station 10' adds the UE 20 to the terminal list of the storage unit 130 or deletes the UE 20 from the terminal list (S972).

Then, the wire communication unit 120 of the base station 10' transmits the terminal list updated by the list update unit 160 to the surrounding base stations 10' (S974). Then, when a response to the terminal list is received from the surrounding base stations 10', the base station 10' completes the update processing by notifying the UE 20 of the update completion (S976). On the other hand, if an update notification is not received by the wire communication unit 120 from the surrounding base station 10', the wire communication unit 120 retransmits the updated terminal list to the surrounding base stations 10' (S974).

Figure 39:
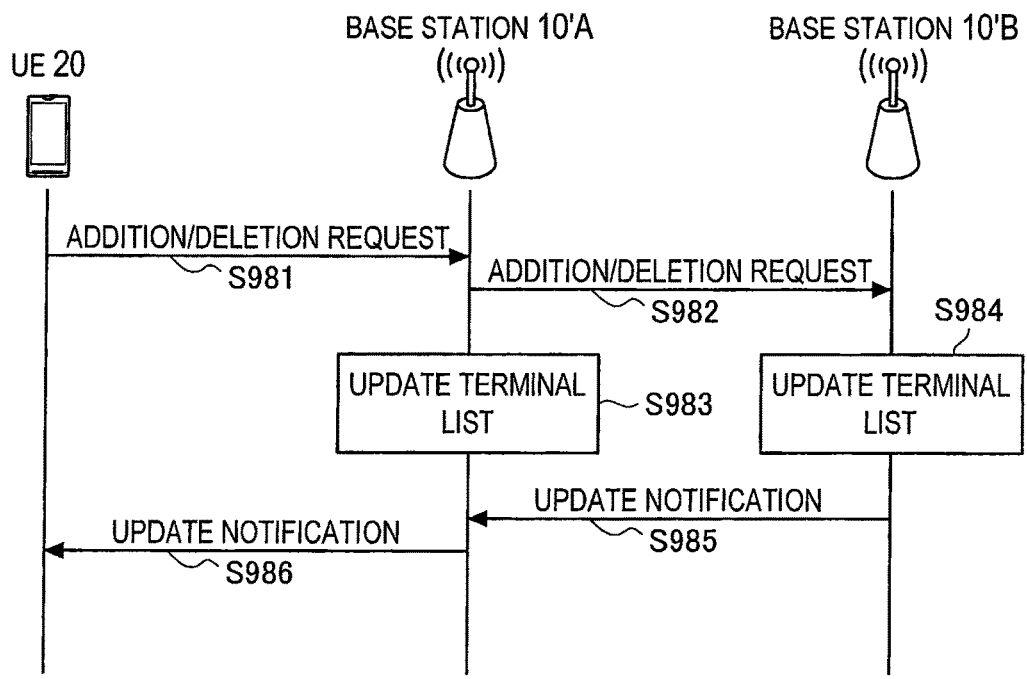
FIG. 39 is a sequence diagram showing the update processing of the terminal list by the base station from another viewpoint.

FIG. 39 is a sequence diagram showing the update processing of the terminal list by the base station 10' from another viewpoint. As shown in FIG. 39, when the UE 20 requests the base station 10'A to add/delete the UE 20 to/from the terminal list (S981), the base station 10'A transmits the request to the other base station 10'B (S982). FIG. 39 shows only the two base stations 10', but when the more base stations 10' constitute a communication system, each of the base stations 10' may sequentially transfer the request, for example, in a relay form.

Then, each of the base stations 10' having received the request to add/delete the UE 20 to/from the terminal list updates the terminal list according to the request (S983, S984). Then, each of the base stations 10' transmits an update notification indicating that the terminal list is updated (S985, S986).

An example in which each of the base stations 10' individually updates the terminal list is described above, but as will be described with reference to FIG. 40, one apparatus such as the management node 30' may update the terminal list.

Figure 40:
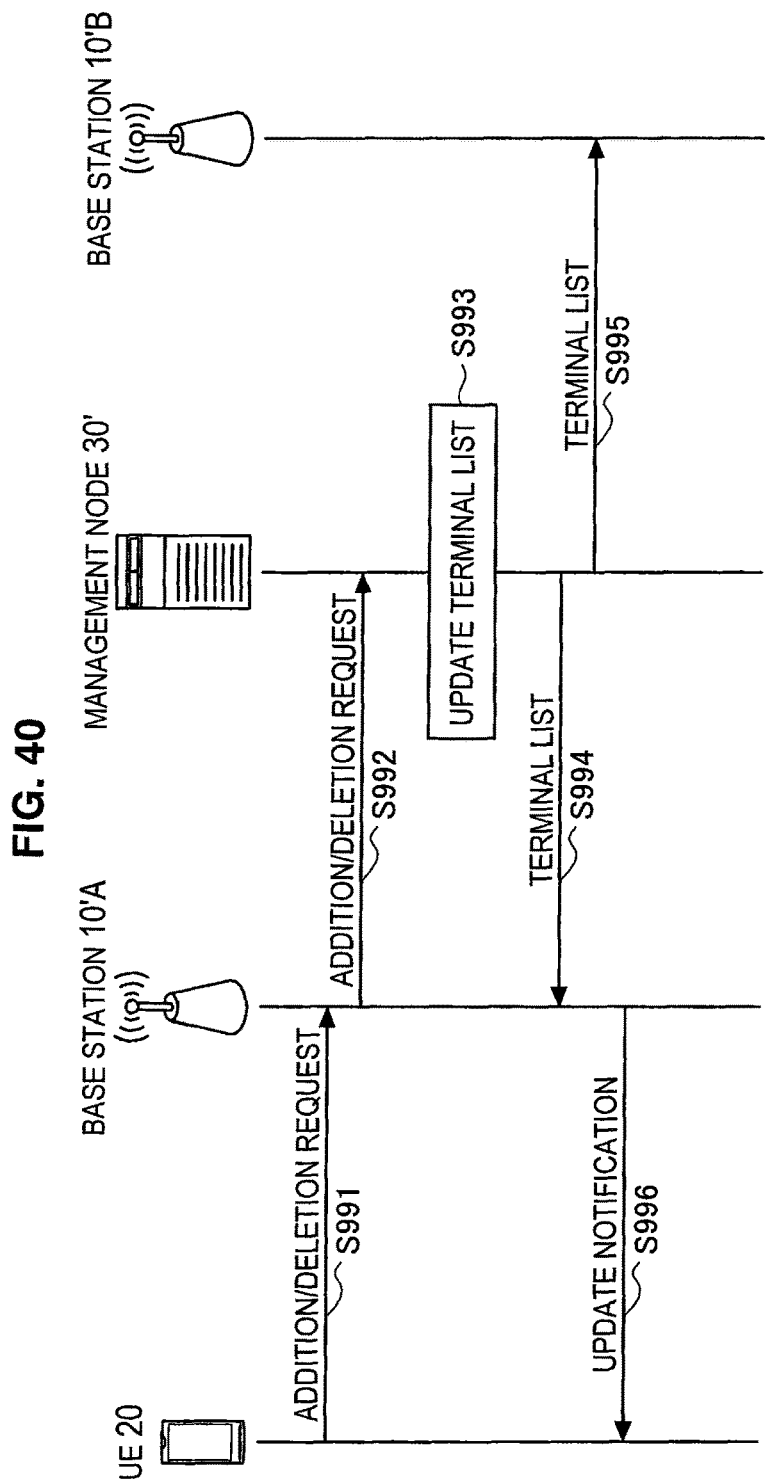
FIG. 40 is a sequence diagram showing the update processing of the terminal list by the management node.

FIG. 40 is a sequence diagram showing the update processing of the terminal list by the management node 30'. As shown in FIG. 40, when the UE 20 requests the base station 10'A to add/delete the UE 20 to/from the terminal list (S991), the base station 10'A transmits the request to the management node 30' (S992) and then, the management node 30' updates the terminal list according to the request (S993) and transmits the updated terminal list to each of the base stations (S994, S995). Then, base station 10'A transmits an update notification indicating that the terminal list is updated to the UE 20 (S996).

As described above, the base station 10'A or the management node 30' may update the terminal list in accordance with, for example, a request from the UE 20 or update the terminal list in accordance with a request from outside the communication system or a human operation on the base station 10'A or the management node 30'.

<<4. Summary>>

According to the present disclosure, even if the UE 20 is grouped and many base stations like CSG cells that distinguish an operation to the UE 20 belonging to each group are introduced, CoMP including such base stations can be implemented and therefore, a combined effect of the introduction of CSG cells and the introduction of CoMP can be obtained. As a result, communication capacities in the whole area can be improved while efficiently covering communication traffic that arises locally and therefore, user experience can be improved.

Although preferred embodiments of the present disclosure have been described in detail with reference to the appended drawings, the technical scope of the present disclosure is by no means limited to these examples. A person skilled in the art finds various alterations and modifications within the scope of the appended claims, and it should be understood that they will naturally come under the technical scope of the present invention.

For example, each step of processing by the base station 10, the management node 30 and the like in this specification does not necessarily need to be executed chronologically in the order described as a sequence diagram or flow chart. For example, each step of processing by the base station 10, the management node 30 and the like may be executed in an order that is different from the order described as a flow chart or in parallel.

A computer program that causes hardware such as a CPU, ROM, and RAM contained in the base station 10, the management node 30 and the like to function on a par with each configuration of the base station 10, the management node 30 and the like can be created. In addition, a storage medium in which the computer program is stored is provided.

Additionally, the present technology may also be configured as below.

(1)

A communication control apparatus including:

a communication controller that controls communication with other communication control apparatuses, the communication exchanging information about terminal grouping to distinguish operations to a specific wireless terminal and to other wireless terminals.

(2)

The communication control apparatus according to (1), wherein the communication controller controls communication of inquiry about whether the other communication control apparatuses perform the terminal grouping.

(3)

The communication control apparatus according to (1) or (2), wherein the communication controller controls communication of inquiry about a terminal list showing the terminal grouping in the other communication control apparatuses.

(4)

The communication control apparatus according to any one of (1) to (3), wherein the communication controller controls the communication of an inquiry about whether the other communication control apparatuses have a terminal list containing a target wireless terminal as the specific wireless terminal.

(5)

The communication control apparatus according to any one of (1) to (4), wherein the communication controller controls the communication of an inquiry about whether it is possible to participate in cooperative communication linked to the other communication control apparatuses to communicate with a target wireless terminal.

(6)

The communication control apparatus according to any one of (1) to (5), wherein the communication controller controls transmission of the information about whether the communication control apparatus performs the terminal grouping in response to an inquiry from the other communication control apparatuses.

(7)

The communication control apparatus according to any one of (1) to (6), wherein the communication controller controls transmission of the information about whether the communication control apparatus has a terminal list containing a target wireless terminal as the specific wireless terminal in response to an inquiry from the other communication control apparatuses.

(8)

The communication control apparatus according to any one of (1) to (7), wherein when the communication control apparatus has a terminal list containing a target wireless terminal as the specific wireless terminal, the communication controller controls transmission of the information indicating participation in cooperative communication in response to an inquiry about whether it is possible to participate in the cooperative communication from the other communication control apparatuses.

(9)

The communication control apparatus according to any one of (1) to (8), further including:

a list comparison unit that compares a terminal list received from the other communication control apparatuses and showing the terminal grouping and a terminal list held by the communication control apparatus; and a list update unit that, when the both lists are determined to be different by the list comparison unit, matches the terminal list held by the communication control apparatus to the terminal list received from the other communication control apparatuses.

(10)

The communication control apparatus according to any one of (1) to (8), further including:

a list comparison unit that compares a terminal list received from the other communication control apparatuses and showing the terminal grouping and a terminal list held by the communication control apparatus, wherein, when the both lists are determined to be different by the list comparison unit, the communication controller controls communication that requests matching of the terminal list held by the other communication control apparatuses to the terminal list held by the communication control apparatus.

(11)

The communication control apparatus according to any one of (1) to (8), further including:

a list comparison unit that compares a plurality of terminal lists received from each of a plurality of the other communication control apparatuses and showing the terminal grouping; and a list creation unit that creates a new terminal list when the list comparison unit determines that the terminal list that is different from the other terminal lists is contained in the plurality of terminal lists, wherein the communication controller controls transmission of the new terminal list created by the list creation unit to the plurality of the other communication control apparatuses.

(12)

The communication control apparatus according to any one of (1) to (11), wherein the specific terminal is one of a terminal permitted to connect to the communication control apparatus and a terminal preferentially connected to the communication control apparatus.

(13)

A communication control method which controls communication with other communication control apparatuses, the communication exchanging information about terminal grouping to distinguish operations to a specific wireless terminal and to other wireless terminals.

(14)

A program causing a computer to function as a communication controller that controls communication with other communication control apparatuses, the communication exchanging information about terminal grouping to distinguish operations to a specific wireless terminal and to other wireless terminals.

(15)

A communication system including:

a first communication control apparatus; and a second communication control apparatus, wherein the first communication control apparatus includes a communication controller that controls communication with the second communication control apparatus, the communication exchanging information about terminal grouping to distinguish operations to a specific wireless terminal and to other wireless terminals.

REFERENCE SIGNS LIST

10 base station
20 UE
30 management node
110 wireless communication unit
120, 320 wire communication unit
130 storage unit
140, 142, 342 communication controller
150, 350 list comparison unit
160 list update unit
170 list creation unit

The invention claimed is:

1. A communication control system, comprising:
a plurality of first communication control apparatuses;
a second communication control apparatus;
a communication controller configured to control communication of the second communication control apparatus with the plurality of first communication control apparatuses,
wherein the communication between the second communication control apparatus and the plurality of first communication control apparatuses includes exchange of information associated with terminal grouping,
wherein the second communication control apparatus is configured to distinguish operations to a specific wireless terminal and to a plurality of wireless terminals based on the exchange of the information associated with the terminal grouping, and
wherein the communication controller is further configured to implement a cooperative communication, based on the exchange of the information, such that the second communication control apparatus and at least one of the plurality of first communication control apparatuses are coordinated to communicate with a target wireless terminal, and wherein during the cooperative communication:
  a first time of the communication of the second communication control apparatus and a second time of the communication of the at least one of the plurality of first communication control apparatuses are different, and
  a first frequency of the communication of the second communication control apparatus and a second frequency of the communication of the at least one of the plurality of first communication control apparatuses are same,
wherein at least one of transmission power or antenna directivity, determined from parameters of past transmission of a signal to the target wireless terminal, is changed for the second communication control apparatus and the at least one of the plurality of first communication control apparatuses; and
a list comparison unit configured to compare a first terminal list received from the plurality of first communication control apparatuses that show the terminal grouping and a second terminal list held by the second communication control apparatus, based on at least one terminal contained in the first terminal list and at least one terminal contained in the second terminal list.

2. The communication control system according to claim 1, wherein the communication controller is further configured to control communication of an inquiry about the plurality of first communication control apparatuses that show the terminal grouping.

3. The communication control system according to claim 1, wherein the communication controller is further configured to control communication of an inquiry about a terminal list that shows the terminal grouping in the plurality of first communication control apparatuses.

4. The communication control system according to claim 1, wherein the communication controller is further configured to control communication of an inquiry about the plurality of first communication control apparatuses that have the first terminal list, and wherein the first terminal list contains the target wireless terminal as the specific wireless terminal.

5. The communication control system according to claim 1, wherein the communication controller is further configured to control communication of an inquiry about possibility to participate in the cooperative communication linked to the plurality of first communication control apparatuses to communicate with the target wireless terminal.

6. The communication control system according to claim 1, wherein the communication controller is further configured to control transmission of information associated with the second communication control apparatus that shows the terminal grouping based on an inquiry from the plurality of first communication control apparatuses.

7. The communication control system according to claim 1, wherein the communication controller is further configured to control transmission of information associated with the second communication control apparatus that has the second terminal list, and wherein the second terminal list contains the target wireless terminal as the specific wireless terminal based on an inquiry from the plurality of first communication control apparatuses.

8. The communication control system according to claim 1, wherein, based on the second communication control apparatus that has the second terminal list that contains the target wireless terminal as the specific wireless terminal, the communication controller is further configured to control transmission of information indicating participation in the cooperative communication based on an inquiry about possibility to participate in the cooperative communication from the plurality of first communication control apparatuses.

9. The communication control system according to claim 1, further comprising
a list update unit configured to update, based on the first terminal list and the second terminal list, wherein the second terminal list is held by the second communication control apparatus to the first terminal list received from the plurality of first communication control apparatuses, and wherein the first terminal list is different from the second terminal list.

10. The communication control system according to claim 1, further comprising
wherein, based on the first terminal list and the second terminal list, the communication controller is further configured to control communication that request to update the first terminal list held by the plurality of first communication control apparatuses to the second terminal list held by the second communication control apparatus, and wherein the first terminal list is different from the second terminal list.

11. The communication control system according to claim 1, further comprising
a list creation unit configured to create a new terminal list based on a plurality of terminal lists received from each of the plurality of first communication control apparatuses that shows the terminal grouping,
wherein the communication controller is further configured to control transmission of the new terminal list created by the list creation unit to the plurality of first communication control apparatuses.

12. The communication control system according to claim 1, wherein the specific wireless terminal is one of a first terminal permitted to connect to the second communication control apparatus or a second terminal that is preferred to connect to the second communication control apparatus.

13. The communication control system according to claim 1, wherein the communication controller is further configured to set communication parameters for execution of the cooperative communication with the plurality of first communication control apparatuses.

14. The communication control system according to claim 1, wherein, based on implementation of the cooperative communication, the second communication control apparatus is configured to notify each of the plurality of first communication control apparatuses about a terminal ID of the target wireless terminal.

15. The communication control system according to claim 1, wherein the communication controller is further configured to determine the change in the at least one of the transmission power or the antenna directivity to set the at least one of the transmission power or the antenna directivity for the second communication control apparatus and the at least one of the plurality of first communication control apparatuses.

16. A communication control method, comprising:
in a second communication control apparatus:
controlling, by a communication controller, communication of the second communication control apparatus with a plurality of first communication control apparatuses,
  wherein the communication between the second communication control apparatus and the plurality of first communication control apparatuses includes exchanging information associated with terminal grouping, wherein the second communication control apparatus is configured to distinguish operations to a specific wireless terminal and to a plurality of wireless terminals based on the exchanging of the information associated with the terminal grouping, and wherein the communication controller is further configured to implement a cooperative communication, based on the exchanging of the information, such that the second communication control apparatus and at least one of the plurality of first communication control apparatuses are coordinated to communicate with a target wireless terminal, and wherein during the cooperative communication:
a first time of the communication of the second communication control apparatus and a second time of the communication of the at least one of the plurality of first communication control apparatuses are different, and a first frequency of the communication of the second communication control apparatus and a second frequency of the communication of the at least one of the plurality of first communication control apparatuses are same, wherein at least one of transmission power or antenna directivity, determined from parameters of past transmission of a signal to the target wireless terminal, is changed for the second communication control apparatus and the at least one of the plurality of first communication control apparatuses; and comparing a first terminal list received from the plurality of first communication control apparatuses that show the terminal grouping and a second terminal list held by the second communication control apparatus, based on at least one terminal contained in the first terminal list and at least one terminal contained in the second terminal list.

17. A non-transitory computer-readable recording medium having stored thereon computer-executable instructions that, when executed by a computer, cause the computer to execute operations, the operations comprising:

controlling, by a communication controller of a second communication control apparatus, communication of the second communication control apparatus with a plurality of first communication control apparatuses, wherein the communication between the second communication control apparatus and the plurality of first communication control apparatuses includes exchanging information associated with terminal grouping, wherein the second communication control apparatus is configured to distinguish operations to a specific wireless terminal and to a plurality of wireless terminals based on the exchanging of the information associated with the terminal grouping, and wherein the communication controller is further configured to implement a cooperative communication, based on the exchanging of the information, such that the second communication control apparatus and at least one of the plurality of first communication control apparatuses are coordinated to communicate with a target wireless terminal, and wherein during the cooperative communication:
a first time of the communication of the second communication control apparatus and a second time of the communication of the at least one of the plurality of first communication control apparatuses are different, and a first frequency of the communication of the second communication control apparatus and a second frequency of the communication of the at least one of the plurality of first communication control apparatuses are same, wherein at least one of transmission power or antenna directivity, determined from parameters of past transmission of a signal to the target wireless terminal, is changed for the second communication control apparatus and the at least one of the plurality of first communication control apparatuses; and comparing a first terminal list received from the plurality of first communication control apparatuses that show the terminal grouping and a second terminal list held by the second communication control apparatus, based on at least one terminal contained in the first terminal list and at least one terminal contained in the second terminal list.

18. A communication system, comprising:
a first communication control apparatus;
a second communication control apparatus,
wherein the first communication control apparatus includes a communication controller configured to control communication of the first communication control apparatus with the second communication control apparatus, wherein the communication between the first communication control apparatus and the second communication control apparatus includes exchange of information associated with terminal grouping, wherein the first communication control apparatus and the second communication control apparatus are configured to distinguish operations to a specific wireless terminal and to a plurality of wireless terminals based on the exchange of the information associated with the terminal grouping, and wherein the communication controller is further configured to implement a cooperative communication, based on the exchange of the information, such that the first communication control apparatus and the second communication control apparatus are coordinated to communicate with a target wireless terminal, and wherein during the cooperative communication:
a first time of the communication of the first communication control apparatus and a second time of the communication of the second communication control apparatus are different, and a first frequency of the communication of the first communication control apparatus and a second frequency of the communication of the second communication control apparatus are same, wherein at least one of transmission power or antenna directivity, determined from parameters of past transmission of a signal to the target wireless terminal, is changed for the first communication control apparatus and the second communication control apparatus; and a list comparison unit configured to compare a first terminal list received from the first communication control apparatus that shows the terminal grouping and a second terminal list held by the second communication control apparatus, based on at least one terminal contained in the first terminal list and at least one terminal contained in the second terminal list.

* * * * *